United States Patent
Matsuura et al.

(10) Patent No.: US 12,339,144 B2
(45) Date of Patent: Jun. 24, 2025

(54) OPTICAL FIBER CHARACTERISTIC MEASUREMENT DEVICE, OPTICAL FIBER CHARACTERISTIC MEASUREMENT PROGRAM, AND OPTICAL FIBER CHARACTERISTIC MEASUREMENT METHOD FOR MEASURING CHARACTERISTICS OF OPTICAL FIBER BASED ON BRILLOUIN GAIN SPECTRUM

(71) Applicant: Yokogawa Electric Corporation, Tokyo (JP)

(72) Inventors: Satoshi Matsuura, Musashino (JP); Shin-Ichirou Tezuka, Musashino (JP); Masayoshi Honma, Musashino (JP); Yoshihiro Kumagai, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 184 days.

(21) Appl. No.: 18/010,720

(22) PCT Filed: Jun. 29, 2021

(86) PCT No.: PCT/JP2021/024484
§ 371 (c)(1),
(2) Date: Dec. 15, 2022

(87) PCT Pub. No.: WO2022/009727
PCT Pub. Date: Jan. 13, 2022

(65) Prior Publication Data
US 2023/0324202 A1    Oct. 12, 2023

(30) Foreign Application Priority Data
Jul. 6, 2020    (JP) .................................. 2020-116380

(51) Int. Cl.
*G01D 5/353* (2006.01)
*G01M 11/00* (2006.01)
(Continued)

(52) U.S. Cl.
CPC ..... *G01D 5/35364* (2013.01); *G01M 11/0271* (2013.01); *G01M 11/3109* (2013.01); *G01K 11/322* (2021.01)

(58) Field of Classification Search
CPC .......... G01D 5/35364; G01M 11/0271; G01M 11/3109; G01K 11/322
See application file for complete search history.

(56) References Cited

U.S. PATENT DOCUMENTS 11,105,659 B2 *   8/2021  Lee, II ............... G01D 5/35364
11,231,278 B1 *   1/2022  Digonnet ............. H04B 10/503
(Continued)

FOREIGN PATENT DOCUMENTS

JP    2009-139241 A    6/2009

OTHER PUBLICATIONS

Manotham et al., "Simulation and Experiment for Verifying Intensity Modulation Scheme in Brillouin Optical Correlation Domain Reflectometry", CLEO Technical Digest, 2012.
(Continued)

*Primary Examiner* — Michelle M Iacoletti
*Assistant Examiner* — Maher Yazback
(74) *Attorney, Agent, or Firm* — RANKIN, HILL & CLARK LLP

(57) ABSTRACT

An optical fiber characteristic measurement device (1) includes a light detector (16) configured to detect Brillouin scattered light (LS) obtained by causing light to be incident on an optical fiber (FUT); a signal processor (18b) configured to obtain, on the basis of a detection signal (S1) which is output from the light detector, a first Brillouin gain
(Continued)

spectrum (B1) which is a spectrum of the Brillouin scattered light obtained in a case where a spectral width of the light incident on the optical fiber is a first width and a second Brillouin gain spectrum (B2) which is a spectrum of the Brillouin scattered light obtained in a case where the spectral width of the light incident on the optical fiber is a second width larger than the first width; and a measurer (18c) configured to measure characteristics of the optical fiber on the basis of the first Brillouin gain spectrum and the second Brillouin gain spectrum.

18 Claims, 8 Drawing Sheets

(51) Int. Cl.
*G01M 11/02* (2006.01)
*G01K 11/322* (2021.01)

(56) References Cited

U.S. PATENT DOCUMENTS

| | | | |
|---|---|---|---|
| 2010/0225900 A1* | 9/2010 | Hotate | G01M 11/39 356/73.1 |
| 2019/0195731 A1* | 6/2019 | Furukawa | G01M 11/319 |
| 2020/0124497 A1* | 4/2020 | Furukawa | G01D 5/35306 |
| 2021/0018343 A1* | 1/2021 | Takahashi | G01D 5/35364 |
| 2021/0325210 A1* | 10/2021 | Matsuura | G01D 5/35364 |
| 2021/0381925 A1* | 12/2021 | Takahashi | G01M 11/3145 |

OTHER PUBLICATIONS

Matsuoka et al., "Brillouin Optical Correlation Domain Reflectometry with Double Frequency Modulation and Phase Modulation", Proceedings of SPIE, 2014, vol. 9157, total 5 pages.

* cited by examiner

OPTICAL FIBER CHARACTERISTIC MEASUREMENT DEVICE, OPTICAL FIBER CHARACTERISTIC MEASUREMENT PROGRAM, AND OPTICAL FIBER CHARACTERISTIC MEASUREMENT METHOD FOR MEASURING CHARACTERISTICS OF OPTICAL FIBER BASED ON BRILLOUIN GAIN SPECTRUM

TECHNICAL FIELD

The present invention relates to an optical fiber characteristic measurement device, an optical fiber characteristic measurement program, and an optical fiber characteristic measurement method.

BACKGROUND ART

An optical fiber characteristic measurement device is a device that causes continuous light or pulsed light to be incident on an optical fiber under test, detects scattered light or reflected light generated in the optical fiber under test, and measures strain distribution, temperature distribution, vibration distribution, and other characteristics in the length direction of the optical fiber under test. In such an optical fiber characteristic measurement device, since the frequency and magnitude of the detected scattered light or reflected light change depending on physical quantities (such as, for example, strain, temperature, and vibration) that influence an optical fiber under test, the optical fiber under test itself is used as a sensor.

One of such optical fiber characteristic measurement devices is a Brillouin optical correlation domain reflectometry (BOCDR) type. A BOCDR-type optical fiber characteristic measurement device causes pump light which is frequency-modulated light to be incident from one end of an optical fiber under test, and detects the result obtained by causing Brillouin scattered light emitted from the one end of the optical fiber under test and reference light (light of which the frequency is modulated in the same manner as the pump light) to interfere with each other. The optical fiber characteristic measurement device measures the characteristics of the optical fiber under test by obtaining a spectrum of Brillouin scattered light (hereinafter referred to as a "Brillouin gain spectrum") from the obtained detection signal and obtaining the amount of frequency shift of the Brillouin scattered light with respect to incident light (hereinafter referred to as "the amount of Brillouin frequency shift").

The BOCDR-type optical fiber characteristic measurement device causes the Brillouin scattered light and the reference light to interfere with each other to thereby selectively extract the Brillouin scattered light at a specific position where a "correlation peak" appears in the optical fiber under test. Here, the position where a "correlation peak" appears is a position where frequency modulation phases of the Brillouin scattered light and the reference light coincide with each other. A Brillouin gain spectrum obtained at this position has no spread due to no frequency modulation and has a thin and tall shape. On the other hand, a Brillouin gain spectrum obtained at a position other than the position where a correlation peak appears has a spread due to frequency modulation, and thus has a shape like an isosceles trapezoid with a low height and a spread. Therefore, the amount of Brillouin frequency shift of the Brillouin scattered light obtained from the entire optical fiber under test coincides with the amount of Brillouin frequency shift of the Brillouin scattered light at the correlation peak position.

In the BOCDR-type optical fiber characteristic measurement device, the correlation peak can be moved in the length direction of the optical fiber under test by sweeping the modulation frequencies of the pump light and the reference light. Therefore, strain distribution, temperature distribution, vibration distribution, and the like in the length direction of the optical fiber under test can be measured by obtaining the amount of Brillouin frequency shift at a position where each correlation peak appears while the correlation peak is moved. Meanwhile, for the details of the BOCDR-type optical fiber characteristic measurement device, see, for example, the following Patent Document 1 and Non Patent Documents 1 and 2.

CITATION LIST

Patent Document

[Patent Document 1]
Japanese Unexamined Patent Application No. 2009-139241
[Non Patent Document]
[Non Patent Document 1]
S. Manotham, M. Kishi, Z. He, and K. Hotate, "Simulation and Experiment for Verifying Intensity Modulation Scheme in Brillouin Optical Correlation Domain Reflectometry," Proc. CLEO, CM4B.3, 6-11 May 2012
[Non Patent Document 2]
O. Matsuoka, M. Kishi, and K. Hotate, "Brillouin Optical Correlation Domain Reflectometry with Double Frequency Modulation and Phase Modulation," Proc. SPIE 9157, 2 Jun. 2014

SUMMARY OF INVENTION

Technical Problem

Incidentally, a Brillouin gain spectrum actually observed by the BOCDR-type optical fiber characteristic measurement device is a sum of a spectrum of Brillouin scattered light generated at the position of the correlation peak (hereinafter referred to as a "foreground light spectrum") and a spectrum of Brillouin scattered light generated at a position other than the position of the correlation peak (hereinafter referred to as a "background light spectrum"). The spectrum of this Brillouin scattered light can generally be said to be a foreground light spectrum superimposed on the upper side of an isosceles trapezoidal background light spectrum. When a strain (or temperature change) is applied to the position of the correlation peak, the foreground light spectrum changes, but the background light spectrum hardly changes. The BOCDR-type optical fiber characteristic measurement device captures a change in the foreground light spectrum and measures the strain applied to the position of the correlation peak.

Here, the shape of the above Brillouin gain spectrum near its maximum value is predominantly determined by the foreground light spectrum in a case where the magnitude of a strain (or temperature change) applied to the position of the correlation peak is small (for example, in a case where the foreground light spectrum can be considered to be superimposed on the upper side of the isosceles trapezoidal background light spectrum). However, as the magnitude of a strain (or temperature change) applied to the position of the correlation peak increases, the amount of change in the foreground light spectrum increases (the amount of Brillouin frequency shift increases), and thus the above shape is predominantly determined by the background light spectrum. That is, when the foreground light spectrum moves to the position of the oblique side of the isosceles trapezoidal background light spectrum due to the strain (or temperature change) applied to the position of the correlation peak, and its height becomes lower than the upper side of the trapezoid, the maximum value of the Brillouin gain spectrum is determined by the background light spectrum. Then, since a change in the foreground light spectrum cannot be captured, there is a problem in that the strain (or temperature change) applied to the position of the correlation peak (that is, any measurement point) is erroneously measured.

The present invention was contrived in view of such circumstances, and an object thereof is to provide an optical fiber characteristic measurement device, an optical fiber characteristic measurement program, and an optical fiber characteristic measurement method that make it possible to measure a large strain applied to an optical fiber under test and temperature change without any error.

Solution to Problem

In order to solve the above problem, according to an aspect of the present invention, there is provided an optical fiber characteristic measurement device (1 to 4) including: a light detector (16, 36) configured to detect Brillouin scattered light (LS) obtained by causing light to be incident on an optical fiber under test (FUT); a signal processor (18b, 20b, 38b, 40b) configured to obtain, on the basis of a detection signal (S1, S2) which is output from the light detector, a first Brillouin gain spectrum (B1) which is a spectrum of the Brillouin scattered light obtained in a case where a spectral width of the light incident on the optical fiber is a first width and a second Brillouin gain spectrum (B2) which is a spectrum of the Brillouin scattered light obtained in a case where the spectral width of the light incident on the optical fiber is a second width larger than the first width; and a measurer (18c, 20c, 38c, 40c) configured to measure characteristics of the optical fiber on the basis of the first Brillouin gain spectrum and the second Brillouin gain spectrum.

In addition, in the optical fiber characteristic measurement device according to an aspect of the present invention, the second width is larger than a spectral width of the Brillouin scattered light obtained from the optical fiber.

In addition, the optical fiber characteristic measurement device according to an aspect of the present invention further includes a light source unit (11) configured to emit light which is incident on the optical fiber and of which a spectral width is the first width or of which a spectral width is the second width.

In addition, in the optical fiber characteristic measurement device according to an aspect of the present invention, the light source unit further includes: a light source (11a) driven by a driving signal (D1) to emit light of which a spectral width is the first width; and a modulator (11b) configured to process the driving signal to set the spectral width of the light emitted from the light source to the second width or to modulate the light emitted from the light source to set the spectral width to the second width.

In addition, the optical fiber characteristic measurement device according to an aspect of the present invention further includes a controller (18d, 38d) configured to cause the signal processor to acquire the first Brillouin gain spectrum by causing the light source unit to emit the light of which the spectral width is the first width, and configured to cause the signal processor to acquire the second Brillouin gain spectrum by causing the light source unit to emit the light of which the spectral width is the second width.

Alternatively, the optical fiber characteristic measurement device according to an aspect of the present invention further includes: a light source unit (11) configured to emit light which is incident on the optical fiber and of which a spectral width is the first width. The signal processor comprises: a first signal processor (21, 41) configured to obtain the first Brillouin gain spectrum on the basis of a detection signal which is output from the light detector in a case where the light emitted from the light source unit is incident on the optical fiber; and a second signal processor (22, 42) configured to use the first Brillouin gain spectrum obtained by the first signal processor to obtain the second Brillouin gain spectrum to be obtained in a case where the spectral width of the light incident on the optical fiber is the second width.

Here, in the optical fiber characteristic measurement device according to an aspect of the present invention, the second signal processor is configured to obtain the second Brillouin gain spectrum by performing a convolution operation on the first Brillouin gain spectrum obtained by the first signal processor and a unimodal spectrum.

In addition, the optical fiber characteristic measurement device according to an aspect of the present invention further includes: a first optical splitter (12) configured to split frequency-modulated light (L1) into pump light (L11) and reference light (L12); and a second optical splitter (13) configured to cause the pump light to be incident from one end of the optical fiber, and configured to output the Brillouin scattered light generated in the optical fiber. The light detector is configured to detect interference light between the Brillouin scattered light and the reference light.

Alternatively, the optical fiber characteristic measurement device according to an aspect of the present invention further includes: a third optical splitter (30) configured to split frequency-modulated light (L1) into first split light (L21) and second split light (L22); a shifter (31) configured to shift a frequency of the first split light or the second split light; an optical switch (33) configured to switch whether the first split light is output as pump light (L31) or not; and a fourth optical splitter (35) configured to cause the pump light which is output from the optical switch to be incident from one end of the optical fiber, and configured to output probe light (L32) as the second split light which is incident from the other end of the optical fiber and passes through the optical fiber and the Brillouin scattered light generated in the optical fiber. The light detector is configured to detect the Brillouin scattered light from a difference between the Brillouin scattered light and the probe light which are output from the fourth optical splitter in a case where the pump light is output from the optical switch and the probe light which is output from the fourth optical splitter in a case where the pump light is not output from the optical switch.

In addition, in the optical fiber characteristic measurement device according to an aspect of the present invention, the measurer includes: a difference calculator (19a) configured to obtain a difference between the first Brillouin gain spectrum and the second Brillouin gain spectrum; and a characteristic measurer (19b) configured to measure characteristics of the optical fiber by obtaining an amount of Brillouin frequency shift from a frequency at which a magnitude of the difference obtained by the difference calculator is maximized.

In addition, the optical fiber characteristic measurement device according to an aspect of the present invention further includes: an optical delay (14) configured to delay the reference light or the pump light spilt by the first optical splitter by a predetermined time.

In addition, the optical fiber characteristic measurement device according to an aspect of the present invention further includes: an optical combiner (15) configured to combine the Brillouin scattered light with the reference light.

In addition, in the optical fiber characteristic measurement device according to an aspect of the present invention, the optical combiner is configured to split the combined light into first light and second light of an intensity ratio specified in advance, and configured to output the first light and the second light to the light detector.

In addition, in the optical fiber characteristic measurement device according to an aspect of the present invention, the light detector includes: a first photodiode (16a) configured to receive the first light which is output from the optical combiner, and configured to output a first light received signal; a second photodiode (16b) configured to receive the second light which is output from the optical combiner, and configured to output a second light received signal, and an adder (16c) configured to output the detection signal indicating a frequency difference between the Brillouin scattered light and the reference light on the basis of the first light received signal and the second light received signal.

In addition, the optical fiber characteristic measurement device according to an aspect of the present invention further includes: a frequency analyzer (17) configured to output the first Brillouin gain spectrum and the second Brillouin gain spectrum by performing frequency analysis on the detection signal which is output from the adder; and a data acquirer (18a) configured to acquire the first Brillouin gain spectrum and the second Brillouin gain spectrum which are output from the frequency analyzer. The signal processor stores the first Brillouin gain spectrum and the second Brillouin gain spectrum acquired by the data acquirer. The measurer is configured to read out the first Brillouin gain spectrum and the second Brillouin gain spectrum stored in the signal processor, and configured to measure the characteristics of the optical fiber on the basis of the first Brillouin gain spectrum and the second Brillouin gain spectrum.

In addition, the optical fiber characteristic measurement device according to an aspect of the present invention further includes: a signal generator (10) configured to generate a specific signal. The controller does not cause the signal generator to output the specific signal in a case where the light of which the spectral width is the first width is emitted from the light source, and causes the signal generator to output the specific signal in a case where the light of which the spectral width is the second width is emitted from the light source.

In addition, in the optical fiber characteristic measurement device according to an aspect of the present invention, the modulator is configured to generate the driving signal on which the specific signal is superimposed in a case where the specific signal is output from the signal generator.

In addition, the optical fiber characteristic measurement device according to an aspect of the present invention further includes: a hardware processor configured to implement the signal processor and the measurer by reading out an optical fiber characteristic measurement program from a recording medium and executing the optical fiber characteristic measurement program.

According to an aspect of the present invention, there is provided an optical fiber characteristic measurement program for causing a computer to execute: a signal processing step (S12, S13, S20) of obtaining, on the basis of a detection signal (S1, S2) obtained by detecting Brillouin scattered light (LS) obtained by causing light to be incident on an optical fiber (FUT), a first Brillouin gain spectrum (B1) which is a spectrum of the Brillouin scattered light obtained in a case where a spectral width of the light incident on the optical fiber is a first width and a second Brillouin gain spectrum (B2) which is a spectrum of the Brillouin scattered light obtained in a case where the spectral width of the light incident on the optical fiber is a second width larger than the first width; and a measurement step (S14 to S16) of measuring characteristics of the optical fiber on the basis of the first Brillouin gain spectrum and the second Brillouin gain spectrum.

According to an aspect of the present invention, there is provided an optical fiber characteristic measurement method including: a signal processing step (S12, S13, S20) of obtaining, on the basis of a detection signal (S1, S2) obtained by detecting Brillouin scattered light (LS) obtained by causing light to be incident on an optical fiber (FUT), a first Brillouin gain spectrum (B1) which is a spectrum of the Brillouin scattered light obtained in a case where a spectral width of the light incident on the optical fiber is a first width and a second Brillouin gain spectrum (B2) which is a spectrum of the Brillouin scattered light obtained in a case where the spectral width of the light incident on the optical fiber is a second width larger than the first width; and a measurement step (S14 to S16) of measuring characteristics of the optical fiber on the basis of the first Brillouin gain spectrum and the second Brillouin gain spectrum.

Further features and aspects of the present invention will become apparent from the detailed description of embodiments set forth below with reference to the accompanying drawings.

Advantageous Effects of Invention

According to the present invention, there is an effect that it is possible to measure a large strain applied to an optical fiber under test and temperature change without any error.

DESCRIPTION OF EMBODIMENTS

Figure 1:
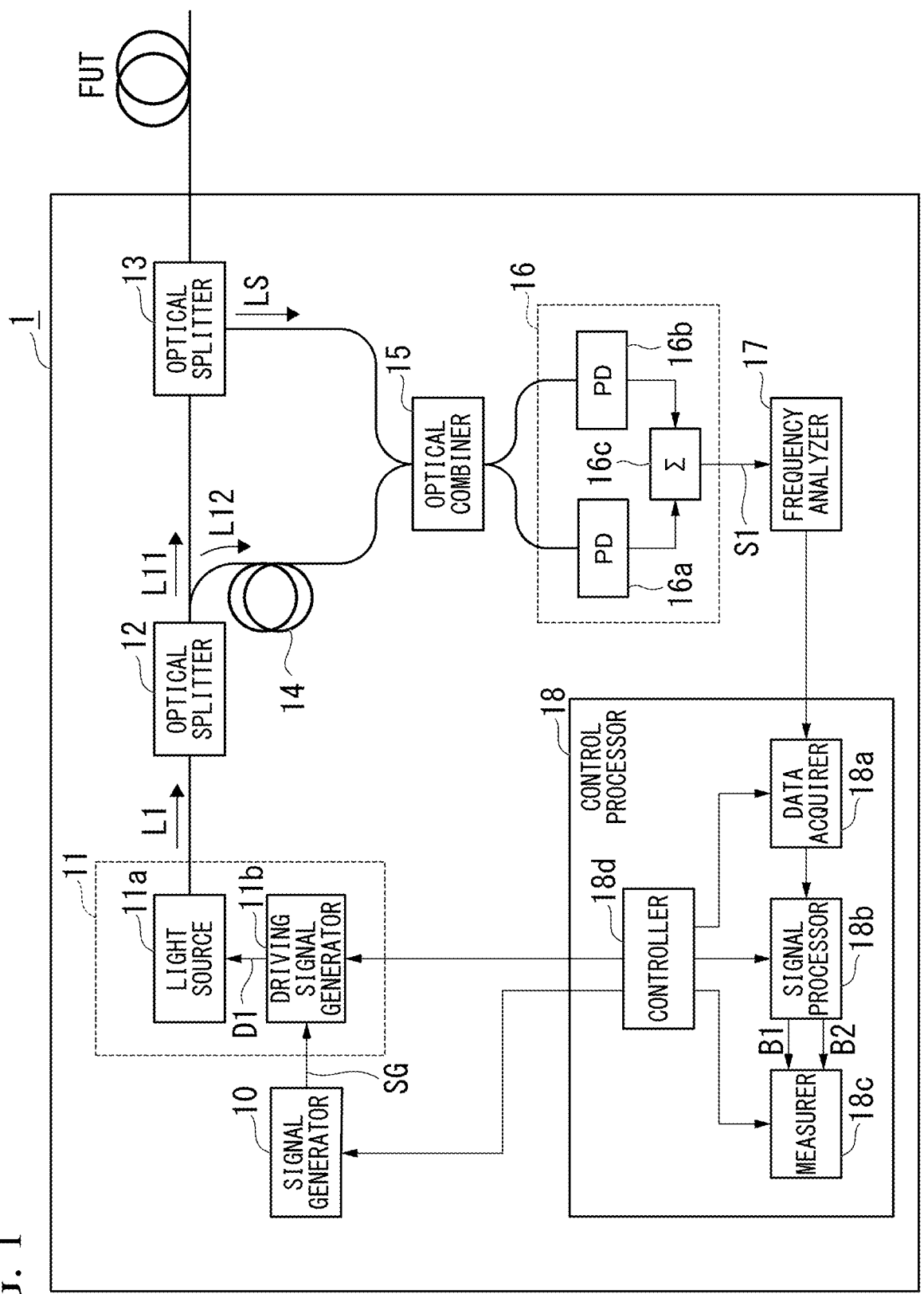
FIG. 1 is a block diagram illustrating main components of an optical fiber characteristic measurement device according to a first embodiment of the present invention.

Hereinafter, an optical fiber characteristic measurement device, an optical fiber characteristic measurement program, and an optical fiber characteristic measurement method according to embodiments of the present invention will be described in detail with reference to the accompanying drawings. Hereinafter, the outline of embodiments of the present invention will be first described, and then the details of each embodiment of the present invention will be described.

[Outline]

Embodiments of the present invention make it possible to measure a large strain applied to an optical fiber under test and temperature change without any error. When a large strain (or temperature change) is applied to a position where the correlation peak appears in the optical fiber under test, the amount of change in a foreground light spectrum becomes large, and the shape of a Brillouin gain spectrum near its maximum value is predominantly determined by a background light spectrum. Then, a change in the foreground light spectrum cannot be found, and a strain (or temperature change) applied to the position of the correlation peak is erroneously measured. As methods of solving such erroneous measurement, the "intensity modulation method" disclosed in Non Patent Document 1 described above and the "phase modulation method" disclosed in Non Patent Document 2 described above have been proposed.

The above "intensity modulation method" is a method of eliminating the above erroneous measurement by performing intensity modulation on pump light (frequency-modulated light) caused to be incident on the optical fiber under test and bringing the shape of the background light spectrum close to flat. However, in the intensity modulation method, since it is necessary to synchronize the intensity modulation of the pump light with the frequency modulation of the pump light, their phases are required to be managed. In addition, in the intensity modulation method, it is necessary to add a modulator for performing intensity modulation, which increases cost and installation space. Further, in the intensity modulation method, the flatness of the shape of the background light spectrum is likely to be influenced by a strain (or temperature change) applied to positions other than the position of the correlation peak.

The above "phase modulation method" is a method of eliminating the above erroneous measurement by obtaining a difference between the measurement results obtained by sequentially causing continuous light on which phase modulation is not performed and continuous light on which phase modulation is performed to be incident on the optical fiber under test to suppress the background light spectrum. When continuous light of a frequency f0 caused to be incident on the optical fiber under test is phase-modulated at a frequency fp, the spectrum of the continuous light is such that the magnitude of the frequency f0 component is zero, so that a sideband can be made to appear at each modulation frequency fp with the frequency f0 as the center, and a background light spectrum with the foreground light spectrum mostly removed can be obtained. However, in the phase modulation method, since it is necessary to perform two measurements, the measurement takes a long time. In addition, in the phase modulation method, it is necessary to add a modulator for performing phase modulation on the continuous light caused to be incident on the optical fiber under test, which increases cost and installation space. Further, in the phase modulation method, a sideband generated during phase modulation influences the shape of the background light spectrum.

Embodiments of the present invention obtain a first Brillouin gain spectrum which is a spectrum of Brillouin scattered light obtained in a case where the spectral width of light incident on the optical fiber under test is a first width and a second Brillouin gain spectrum which is a spectrum of Brillouin scattered light obtained in a case where the spectral width of light incident on the optical fiber under test is a second width larger than the first width, on the basis of a detection signal which is output from a light detector that detects the Brillouin scattered light obtained by causing light to be incident on the optical fiber under test. The characteristics of the optical fiber under test are measured on the basis of the first Brillouin gain spectrum and the second Brillouin gain spectrum. This makes it possible to measure a large strain applied to the optical fiber under test and temperature change without any error.

First Embodiment

<Configuration of Optical Fiber Characteristic Measurement Device>

FIG. 1 is a block diagram illustrating main components of an optical fiber characteristic measurement device according to a first embodiment of the present invention. As shown in FIG. 1, an optical fiber characteristic measurement device 1 of the present embodiment includes a signal generator 10, a light source unit 11, an optical splitter 12 (first optical splitter), an optical splitter 13 (second optical splitter), an optical delay 14, an optical combiner 15, a light detector 16, a frequency analyzer 17, and a control processor 18. Such an optical fiber characteristic measurement device 1 is a so-called BOCDR-type optical fiber characteristic measurement device that measures the characteristics of an optical fiber under test FUT on the basis of Brillouin scattered light LS obtained by causing pump light L11 to be incident on the optical fiber under test FUT.

The pump light L11 is continuous light to which frequency modulation is applied. The Brillouin scattered light LS is backscattered light generated by Brillouin scattering in the optical fiber under test FUT. Meanwhile, the optical fiber under test FUT may be of any type depending on the wavelength of the pump light L11 or the like. In addition, in the present embodiment, for the purpose of simplifying the description, only one correlation peak is assumed to appear in the optical fiber under test FUT.

The signal generator 10 generates a specific signal SG under the control of the control processor 18. The signal generator 10 is provided to increase the spectral width of continuous light L1 which is output from the light source unit 11 (for example, to make it larger than the spectral width of the Brillouin scattered light which is obtained from the optical fiber under test FUT). The signal SG which is generated by the signal generator 10 may be, for example, noise having a Gaussian spectrum, a pseudo-random code on which duo-binary modulation is performed, or other signals. In a case where the signal generator 10 outputs a pseudo-random code, it is desirable to appropriately select code speed, the magnitude of modulation, and bias conditions so that a discrete sideband does not appear in the spectrum of the continuous light L1.

The light source unit 11 includes a light source 11a and a driving signal generator 11b (modulator), and outputs the frequency-modulated continuous light L1 under the control of the control processor 18. The light source 11a includes a semiconductor laser element such as, for example, a distributed feedback laser diode (DFB-LD), and outputs the frequency-modulated continuous light L1 in accordance with a driving signal D1 which is output from the driving signal generator 11b.

In addition, the light source unit 11 outputs the continuous light L1 having a spectral width (first width) of approximately several MHz or the continuous light L1 having a width (second width) larger than the spectral width of the Brillouin scattered light in accordance with the driving signal D1 which is output from the driving signal generator 11b. Hereinafter, the former spectral width is referred to as a "first spectral width," and the latter spectral width is referred to as a "second spectral width." Meanwhile, the first spectral width is determined by the characteristics of a semiconductor laser element included in the light source 11a. The second spectral width is only required to be larger than the spectral width of the Brillouin scattered light (for example, approximately 30 MHz). It is desirable that the second spectral width is for example, approximately 2 to 4 times the spectral width of the Brillouin scattered light (for example, 100 MHz). Meanwhile, hereinafter, the spectral width of the continuous light L1 which is output from the light source unit 11 (the light source 11a) is sometimes referred to as "the line width of the light source 11a."

The driving signal generator 11b generates the driving signal D1 for frequency-modulating the continuous light L1 which is output from the light source 11a under the control of the control processor 18. Specifically, the driving signal generator 11b adds a DC bias current and a sinusoidal AC current to generate the driving signal D1. The driving signal D1 is a sinusoidal signal, and its frequency (modulation frequency fm) and amplitude (modulation amplitude $\Delta$f) are controlled by the control processor 18.

In a case where the signal SG is output from the signal generator 10 by the control of the control processor 18, the driving signal generator 11b generates the driving signal D1 on which the signal SG is superimposed (processes the driving signal D1). In a case where the signal SG is not superimposed on the driving signal D1, the light source unit 11 outputs the continuous light L1 having the first spectral width. On the other hand, in a case where the signal SG is superimposed on the driving signal D1, the light source unit 11 outputs the continuous light L1 having the second spectral width. That is, the spectral width of the continuous light L1 which is output from the light source unit 11 can be increased by superimposing the signal SG on the driving signal D1.

The optical splitter 12 splits the continuous light L1 output from the light source unit 11 into the pump light L11 and reference light L12 having an intensity ratio (for example, 1:1) specified in advance. The optical splitter 13 includes a first port, a second port, and a third port. The first port is connected to the optical splitter 12. The second port is connected to the optical fiber under test FUT. The third port is connected to the optical combiner 15. The optical splitter 13 outputs the pump light L11 which is input from the first port to the second port. In addition, the Brillouin scattered light LS from the optical fiber under test FUT which is input from the second port is output to the third port. Such an optical splitter 13 may be, for example, an optical circulator.

The optical delay 14 delays the reference light L12 spilt by the optical splitter 12 by a predetermined time. The optical delay 14 includes, for example, an optical fiber having a predetermined length. The delay time can be adjusted by changing the length of the optical fiber. The reason of providing such an optical delay 14 is that a 0-order correlation peak whose position appearing even when the modulation frequency fm is swept does not move is placed outside the optical fiber under test FUT.

The optical combiner 15 combines the Brillouin scattered light LS from the optical fiber under test FUT which is output from the third port of the optical splitter 13 with the reference light L12 which is output from the optical splitter 12 and passes through the optical delay 14. In addition, the optical combiner 15 splits the combined light into two beams of light having an intensity ratio (for example, 1:1) specified in advance and outputs the two beams of light to the light detector 16. Each of the two beams of light spilt by the optical combiner 15 includes, for example, 50% of backscattered light from the optical fiber under test FUT and 50% of the reference light. Such an optical combiner 15 may be, for example, an optical coupler.

The light detector 16 performs optical heterodyne detection by causing the Brillouin scattered light LS and the reference light L12 included in the two beams of light output from the optical combiner 15 to interfere with each other. The light detector 16 includes, for example, a balanced photodiode composed of two photodiodes (PD) 16a and 16b, and an adder 16c. The photodiodes 16a and 16b receive the two beams of light, respectively, which are output from the optical combiner 15. Light received signals of the photodiodes 16a and 16b are input to the adder 16c. The adder 16c outputs a detection signal S1 which is an interference signal (beat signal) indicating a frequency difference between the Brillouin scattered light LS and the reference light L12.

The frequency analyzer 17 performs frequency analysis on the detection signal S1 which is output from the light detector 16. That is, the frequency analyzer 17 obtains a Brillouin gain spectrum from the detection signal S1 which is output from the light detector 16. The frequency analyzer 17 includes, for example, a spectrum analyzer (electrical spectrum analyzer: ESA). Meanwhile, the frequency analyzer 17 may include a time axis measurer such as an oscilloscope instead of the spectrum analyzer and a converter that performs fast Fourier transform (FFT), and convert temporally continuous data acquired by the time axis measurer into spectrum data using the converter.

The control processor 18 comprehensively controls the operation of the optical fiber characteristic measurement device 1, and uses the frequency analysis result of the frequency analyzer 17 to perform processing required for measuring the characteristics (such as, for example, strain distribution, temperature distribution, or vibration distribution) of the optical fiber under test FUT. The control processor 18 includes a data acquirer 18a, a signal processor 18b, a measurer 18c, and a controller 18d.

The data acquirer 18a acquires data which is output from the frequency analyzer 17 under the control of the controller 18d. Specifically, in a case where the continuous light L1 having the first spectral width is output from the light source unit 11, the data acquirer 18a acquires data indicating a Brillouin gain spectrum (first Brillouin gain spectrum) which is output from the frequency analyzer 17. In addition, in a case where the continuous light L1 having the second spectral width is output from the light source unit 11, the data acquirer 18a acquires a data indicating a Brillouin gain spectrum (second Brillouin gain spectrum) which is output from the frequency analyzer 17.

The signal processor 18b performs processing specified in advance on the data acquired by the data acquirer 18a under the control of the controller 18d. Specifically, the signal processor 18b sequentially obtains the first Brillouin gain spectrum and the second Brillouin gain spectrum acquired by the data acquirer 18a and stores or holds these spectra individually. In addition, the signal processor 18b may read out the stored first Brillouin gain spectrum or second Brillouin gain spectrum and perform a process of drawing the read-out spectrum on a display device (not shown).

Figure 2:
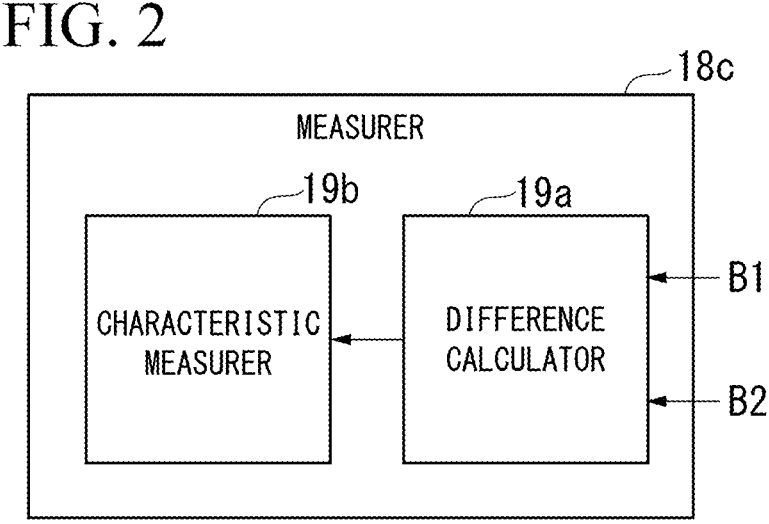
FIG. 2 is a block diagram illustrating a configuration of a measurer included in the optical fiber characteristic measurement device according to the first embodiment of the present invention.

The measurer 18c reads out the first Brillouin gain spectrum B1 and the second Brillouin gain spectrum B2 stored in the signal processor 18b. The measurer 18c measures the characteristics of the optical fiber under test FUT on the basis of the first Brillouin gain spectrum B1 and the second Brillouin gain spectrum B2. FIG. 2 is a block diagram illustrating a configuration of a measurer included in the optical fiber characteristic measurement device according to the first embodiment of the present invention. As shown in FIG. 2, the measurer 18c includes a difference calculator 19a and a characteristic measurer 19b.

The difference calculator 19a obtains a difference between the first Brillouin gain spectrum B1 and the second Brillouin gain spectrum B2 stored in the signal processor 18b. Here, the difference calculator 19a may perform a process of obtaining the above difference after the magnitudes of the first Brillouin gain spectrum B1 and the second Brillouin gain spectrum B2 are adjusted. The adjustment of the magnitudes is performed, for example, by making the areas of the spectra approximately equal. The characteristic measurer 19b obtains the amount of Brillouin frequency shift from a frequency at which the magnitude of the difference obtained by the difference calculator 19a is maximized, and measures the characteristics of the optical fiber under test FUT. For example, the characteristic measurer 19b converts the amount of Brillouin frequency shift into the magnitude of strain applied to the optical fiber under test FUT and temperature change.

Meanwhile, the measurer 18c may include a display that displays the first Brillouin gain spectrum B1 and the second Brillouin gain spectrum B2 obtained by the signal processor 18b, the measured characteristics (such as, for example, strain distribution, temperature distribution, or vibration distribution) of the optical fiber under test FUT, and the like. The display is, for example, a liquid crystal display, an organic electro luminescence (EL) display device, or the like.

The controller 18d comprehensively controls the operation of the optical fiber characteristic measurement device 1 by controlling the signal generator 10, the driving signal generator 11b of the light source unit 11, and the data acquirer 18a, the signal processor 18b, and the measurer 18c of the control processor 18. For example, the controller 18d controls the signal generator 10 to output the continuous light L1 having the first spectral width or the continuous light L1 having the second spectral width from the light source unit 11.

In addition, the controller 18d controls the driving signal generator 11b of the light source unit 11 to change the modulation frequency fm and the modulation amplitude Δf of the continuous light L1 which is output from the light source unit 11. The reason of changing the modulation frequency fm of the continuous light L1 is that the correlation peak is moved in the length direction of the optical fiber under test FUT. In addition, the controller 18d controls the data acquirer 18a, the signal processor 18b, and the measurer 18c of the control processor 18 to acquire the first Brillouin gain spectrum B1 and the second Brillouin gain spectrum B2 and to obtain the characteristics of the optical fiber under test FUT.

The control processor 18 can be realized by a computer such as, for example, a personal computer. The functions of the control processor 18 (the functions of the data acquirer 18a, the signal processor 18b, the measurer 18c, and the controller 18d) are realized through software, for example, by installing a program for realizing these functions in a computer. That is, the functions of the control processor 18 are realized by software and hardware resources in cooperation.

The program for realizing the functions of the control processor 18 may be distributed in a state where it is recorded in a computer readable recording medium such as, for example, a CD-ROM or a DVD (registered trademark)-ROM, or may be distributed through a network such as the Internet. Meanwhile, the functions of the control processor 18 may be realized using hardware such as a field-programmable gate array (FPGA), a large scale integration (LSI), or an application specific integrated circuit (ASIC).

<Operation of Optical Fiber Characteristic Measurement Device>

Figure 3:
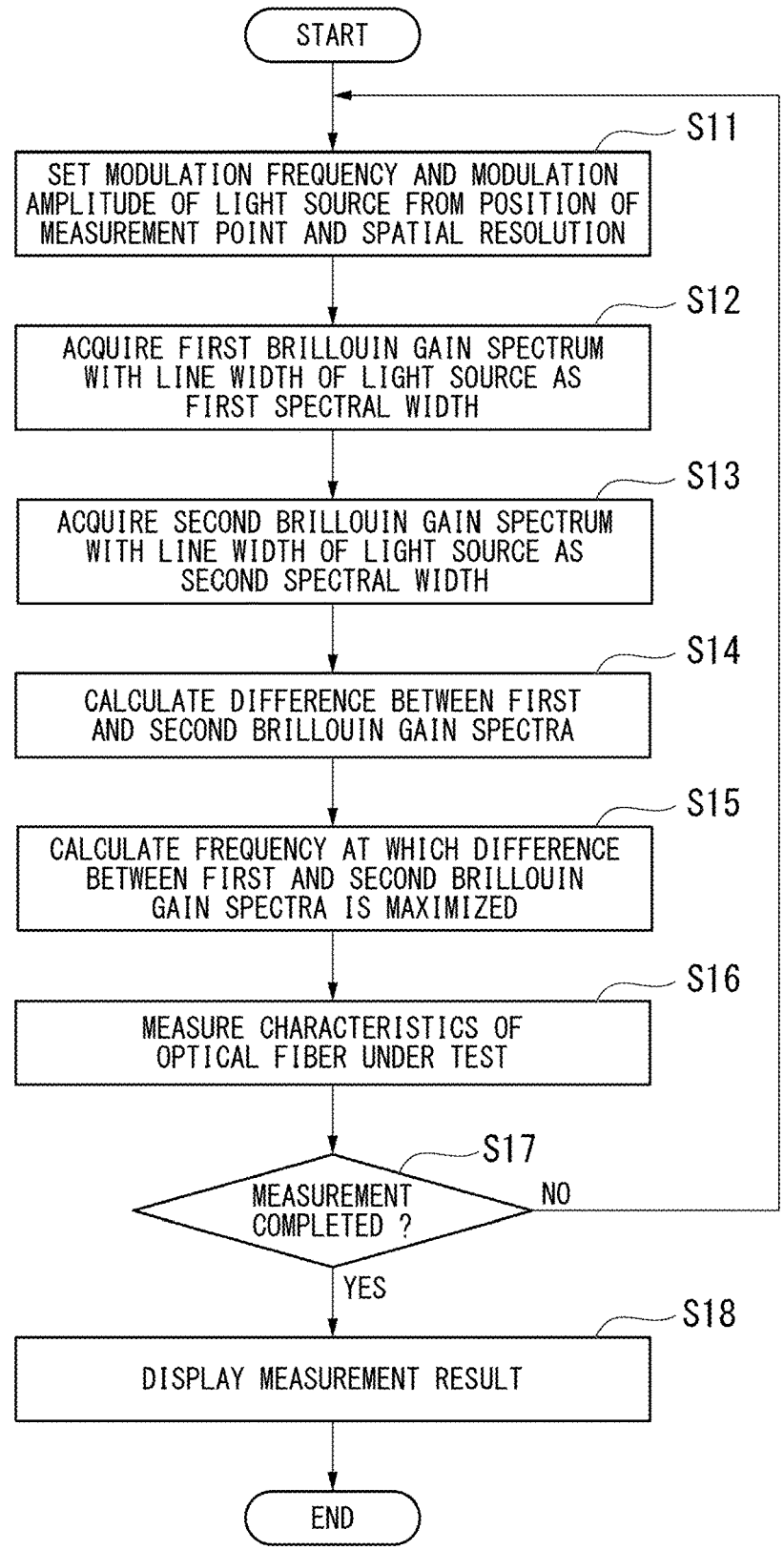
FIG. 3 is a flowchart illustrating an operation example of the optical fiber characteristic measurement device according to the first embodiment of the present invention.

FIG. 3 is a flowchart illustrating an operation example of the optical fiber characteristic measurement device according to the first embodiment of the present invention. The flowchart shown in FIG. 3 shows operations when the characteristics of the optical fiber under test FUT in its length direction are measured. Meanwhile, the flowchart shown in FIG. 3 is started, for example, when the optical fiber characteristic measurement device 1 is instructed to start measurement.

When the processing of the flowchart shown in FIG. 3 is started, first, a process of setting the modulation frequency fm and the modulation amplitude Δf of the light source 11a is performed from the position of a measurement point in the length direction of the optical fiber under test FUT and spatial resolution set in advance (step S11). This process is performed by the controller 18d of the control processor 18 with respect to the driving signal generator 11b of the light source unit 11. This process is performed, and thus the positions of the correlation peaks and intervals between the correlation peaks in the length direction of the optical fiber under test FUT are determined.

Next, a process of acquiring the first Brillouin gain spectrum B1 with the line width of the light source 11a as the first spectral width is performed under the control of the controller 18d (step S12). When this process is started, the driving signal generator 11b is controlled by the controller 18d, and the driving signal D1 is output from the driving signal generator 11b to the light source 11a. Meanwhile, here, the signal generator 10 is not controlled and the signal SG is not output.

When the driving signal D1 is input to the light source 11a, the light source 11a outputs the continuous light L1 having the first spectral width which is frequency-modulated at the modulation frequency fm. The continuous light L1 output from the light source 11a is incident on the optical splitter 12 and is spilt into the pump light L11 and the reference light L12. The spilt pump light L11 is incident on the optical fiber under test FUT through the optical splitter 13 and propagates through the optical fiber under test FUT. Along with this, the Brillouin scattered light LS (backscattered light) is sequentially generated in the optical fiber under test FUT.

Here, the Brillouin scattered light LS which is generated in the optical fiber under test FUT is influenced by an acoustic wave of which the speed changes depending on the strain and temperature of the optical fiber under test FUT, and its frequency is shifted. For example, when the wavelength of the continuous light L1 which is output from the light source unit 11 is assumed to be approximately 1.55 µm, the frequency of the Brillouin scattered light LS which is generated in the optical fiber under test FUT is shifted by, for example, approximately 10.8 GHz with respect to the above continuous light L1. The amount of Brillouin frequency shift fluctuates depending on the strain applied to the optical fiber under test FUT and its temperature. Meanwhile, the spectrum of the Brillouin scattered light LS (Brillouin gain spectrum) is a Lorentzian spectrum with a full width at half maximum of approximately 30 MHz except for spectrum spread associated with frequency modulation.

The Brillouin scattered light LS generated in the optical fiber under test FUT propagates in a direction opposite to the direction in which the pump light L11 propagates and is emitted from one end of the optical fiber under test FUT. The Brillouin scattered light LS emitted from one end of the optical fiber under test FUT is incident on the optical combiner 15 through the optical splitter 13. The Brillouin scattered light LS incident on the optical combiner 15 is combined with the reference light L12 which is spilt by the optical splitter 12 and passes through the optical delay 14, and its interference light is detected by the light detector 16. When the above interference light is detected, the detection signal S1 is output from the light detector 16 to the frequency analyzer 17.

When the detection signal S1 is input to the frequency analyzer 17, frequency analysis is performed on the detection signal S1, and data indicating the Brillouin gain spectrum (the first Brillouin gain spectrum) is output from the frequency analyzer 17. The data output from the frequency analyzer 17 is acquired by the data acquirer 18a of the control processor 18 and is stored in the signal processor 18b.

Next, a process of acquiring the second Brillouin gain spectrum B2 with the line width of the light source 11a as the second spectral width is performed under the control of the controller 18d (step S13). When this process is started, the driving signal generator 11b is controlled by the controller 18d, and the signal generator 10 is controlled by the controller 18d. Thereby, the driving signal D1 on which the signal SG generated by the signal generator 10 is superimposed is output from the driving signal generator 11b to the light source 11a.

When the driving signal D1 is input to the light source 11a, the continuous light L1 having the second spectral width which is frequency-modulated at the modulation frequency fm is output from the light source 11a. As in step S12, the continuous light L1 output from the light source 11a is incident on the optical splitter 12 and is spilt into the pump light L11 and the reference light L12. The spilt pump light L11 is incident on the optical fiber under test FUT through the optical splitter 13 and propagates through the optical fiber under test FUT. Along with this, the Brillouin scattered light LS is sequentially generated in the optical fiber under test FUT.

The Brillouin scattered light LS generated in the optical fiber under test FUT propagates in a direction opposite to the direction in which the pump light L11 propagates and is emitted from one end of the optical fiber under test FUT. The Brillouin scattered light LS emitted from one end of the optical fiber under test FUT is incident on the optical combiner 15 through the optical splitter 13. The Brillouin scattered light LS incident on the optical combiner 15 is combined with the reference light L12 which is spilt by the optical splitter 12 and passes through the optical delay 14, and its interference light is detected by the light detector 16. When the above interference light is detected, the detection signal S1 is output from the light detector 16 to the frequency analyzer 17.

When the detection signal S1 is input to the frequency analyzer 17, frequency analysis is performed on the detection signal S1, and data indicating the Brillouin gain spectrum (the second Brillouin gain spectrum) is output from the frequency analyzer 17. The data output from the frequency analyzer 17 is acquired by the data acquirer 18a of the control processor 18 and is stored in the signal processor 18b.

Next, a process of calculating a difference between the first Brillouin gain spectrum B1 and the second Brillouin gain spectrum B2 is performed by the measurer 18c (step S14). Specifically, the first Brillouin gain spectrum B1 and the second Brillouin gain spectrum B2 stored in the signal processor 18b are read out to the difference calculator 19a (see FIG. 2) provided in the measurer 18c, and the process of calculating a difference therebetween is performed. Meanwhile, the process of calculating a difference may be performed after the magnitudes of the first Brillouin gain spectrum B1 and the second Brillouin gain spectrum B2 are adjusted.

Next, a process of calculating a frequency at which the difference calculated by the difference calculator 19a (the difference between the first Brillouin gain spectrum B1 and the second Brillouin gain spectrum B2) is maximized is performed by the characteristic measurer 19b of the measurer 18c (step S15). A process of measuring the characteristics of the optical fiber under test FUT on the basis of the frequency calculated in step S15 is then performed by the characteristic measurer 19b of the measurer 18c (step S16). For example, a process of converting the frequency calculated in step S15 into the magnitude of strain applied to the optical fiber under test FUT is performed by the characteristic measurer 19b.

When the above processing is completed, the controller 18d determines whether the measurement has been completed (step S17). For example, it is determined whether the measurement has been completed (whether the sweep has been completed) for all the measurement points in the length direction of the optical fiber under test FUT. In a case where the controller 18d determines that the measurement has not been completed (in a case where the determination result in step S17 is "NO"), the process returns to step S11, the position of the measurement point is changed to reset the modulation frequency fm and the modulation amplitude Δf of the light source 11a, and then the processes of steps S12 to S16 are performed.

On the other hand, in a case where the controller 18d determines that the measurement has been completed (in a case where the determination result in step S17 is "YES"), a process of displaying a measurement result is performed under the control of the controller 18d (step S18). For example, a process of displaying a graph (graph showing strain distribution) in which the horizontal axis is a position in the length direction of the optical fiber under test FUT and the vertical axis is the magnitude of strain applied to the optical fiber under test FUT is performed. With the above processing, a series of processes shown in FIG. 3 ends.

Figure 4A:
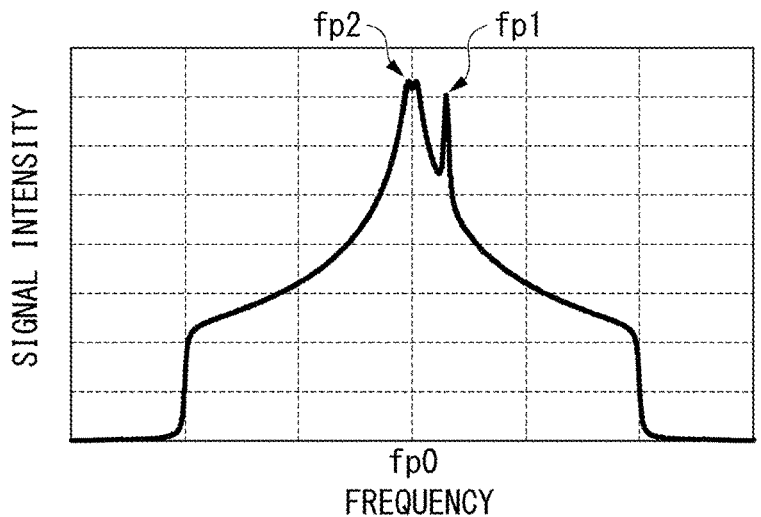
FIG. 4A is a diagram illustrating processing which is performed by the optical fiber characteristic measurement device according to the first embodiment of the present invention.
Figure 4B:
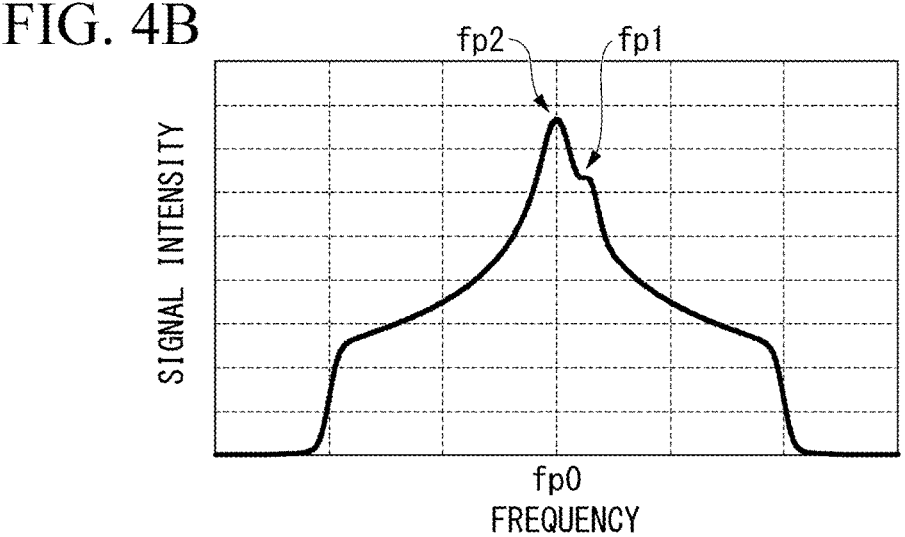
FIG. 4B is a diagram illustrating processing which is performed by the optical fiber characteristic measurement device according to the first embodiment of the present invention.
Figure 4C:
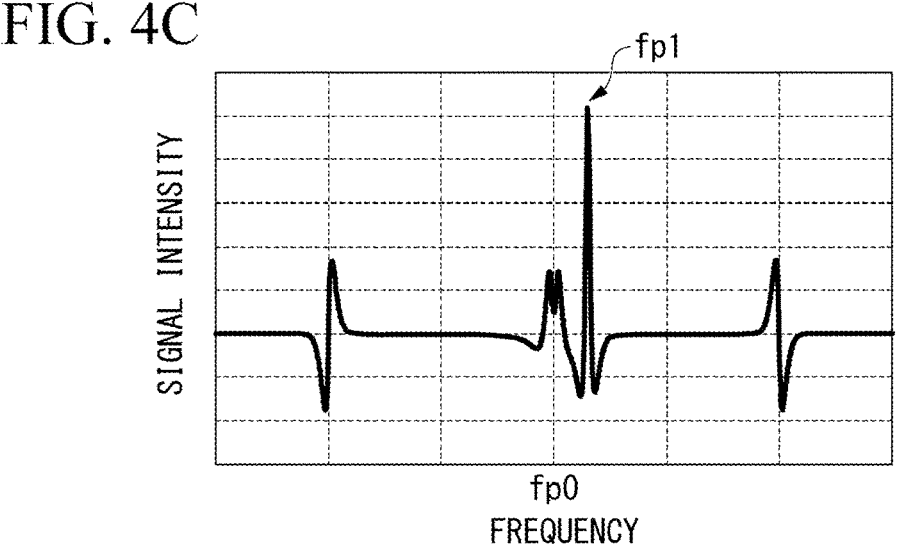
FIG. 4C is a diagram illustrating processing which is performed by the optical fiber characteristic measurement device according to the first embodiment of the present invention.

FIGS. 4A to 4C are diagrams illustrating processing which is performed by the optical fiber characteristic measurement device according to the first embodiment of the present invention. FIG. 4A is a diagram illustrating an example of the first Brillouin gain spectrum, FIG. 4B is a diagram illustrating an example of the second Brillouin gain spectrum, and FIG. 4C is diagram illustrating an example of the difference between the first and second Brillouin gain spectra. In FIGS. 4A to 4C, the horizontal axis represents frequency and the vertical axis represents signal intensity. Meanwhile, note that, in FIGS. 4A and 4B, the vertical axes are adjusted so that the areas of the first and second Brillouin gain spectra are approximately equal to each other.

In FIGS. 4A to 4C, a frequency fp0 is a frequency (peak frequency) at which the signal intensity (magnitude) of the Brillouin gain spectrum is maximized in a case where no strain is applied to the measurement point (position of the correlation peak) of the optical fiber under test FUT. The first Brillouin gain spectrum shown in FIG. 4A is obtained in a case where a large strain is applied to the measurement point (position of the correlation peak) of the optical fiber under test FUT, and frequencies fp1 and fp2 are peak frequencies of the foreground light spectrum and the background light spectrum, respectively. Meanwhile, the foreground light spectrum is a spectrum of Brillouin scattered light generated at the position of the correlation peak, and the background light spectrum is a spectrum of Brillouin scattered light generated at positions other than the position of the correlation peak.

Referring to FIG. 4A, the peak frequency fp1 of the foreground light spectrum deviates greatly from the peak frequency fp0 because a large strain is applied to the measurement point (position of the correlation peak) of the optical fiber under test FUT. On the other hand, the peak frequency fp2 of the background light spectrum is approximately the same as the peak frequency fp0. In addition, it can be understood that the signal intensity at the peak frequency fp1 of the foreground light spectrum is lower than the signal intensity at the peak frequency fp2 of the background light spectrum.

Here, generally, the BOCDR-type optical fiber characteristic measurement device obtains the amount of Brillouin frequency shift on the basis of a frequency at which the magnitude of the Brillouin gain spectrum is maximized. Therefore, as shown in FIG. 4A, when the signal intensity at the peak frequency fp1 of the foreground light spectrum becomes lower than the signal intensity at the peak frequency fp2 of the background light spectrum, a correct amount of Brillouin frequency shift cannot be obtained, and thus the strain applied to the optical fiber under test FUT is erroneously measured. Specifically, the amount of Brillouin frequency shift at the measurement point is obtained on the basis of the peak frequency fp2 instead of the peak frequency fp1.

The second Brillouin gain spectrum shown in FIG. 4B is obtained in a case where a large strain is applied to the measurement point (position of the correlation peak) of the optical fiber under test FUT. Referring to FIG. 4B, in the second Brillouin gain spectrum, the shape in the vicinity of the peak of the foreground light spectrum broadens greatly, the signal intensity decreases, and the overall shape becomes dull. On the other hand, the shape other than the vicinity of the peak is substantially the same as the first Brillouin gain spectrum shown in FIG. 4A.

Referring to FIG. 4C, it can be understood that the difference between the first Brillouin gain spectrum and the second Brillouin gain spectrum has a maximum signal intensity at the peak frequency fp1 of the foreground light spectrum. Therefore, in the process of step S15 of the flowchart shown in FIG. 3, a correct amount of Brillouin frequency shift can be obtained by performing a process of calculating a frequency at which the difference between the first Brillouin gain spectrum B1 and the second Brillouin gain spectrum B2 is maximized.

As described above, in the present embodiment, the first Brillouin gain spectrum B1 is acquired by causing the pump light L11 having the first spectral width to be incident on the optical fiber under test FUT, and the second Brillouin gain spectrum B2 is acquired by causing the pump light L11 having the second spectral width to be incident on the optical fiber under test FUT. The characteristics of the optical fiber under test FUT are then measured on the basis of the first Brillouin gain spectrum B1 and the second Brillouin gain spectrum B2. This makes it possible to measure a large strain applied to the optical fiber under test FUT and temperature change without any error.

Second Embodiment

<Configuration of Optical Fiber Characteristic Measurement Device>

Figure 5:
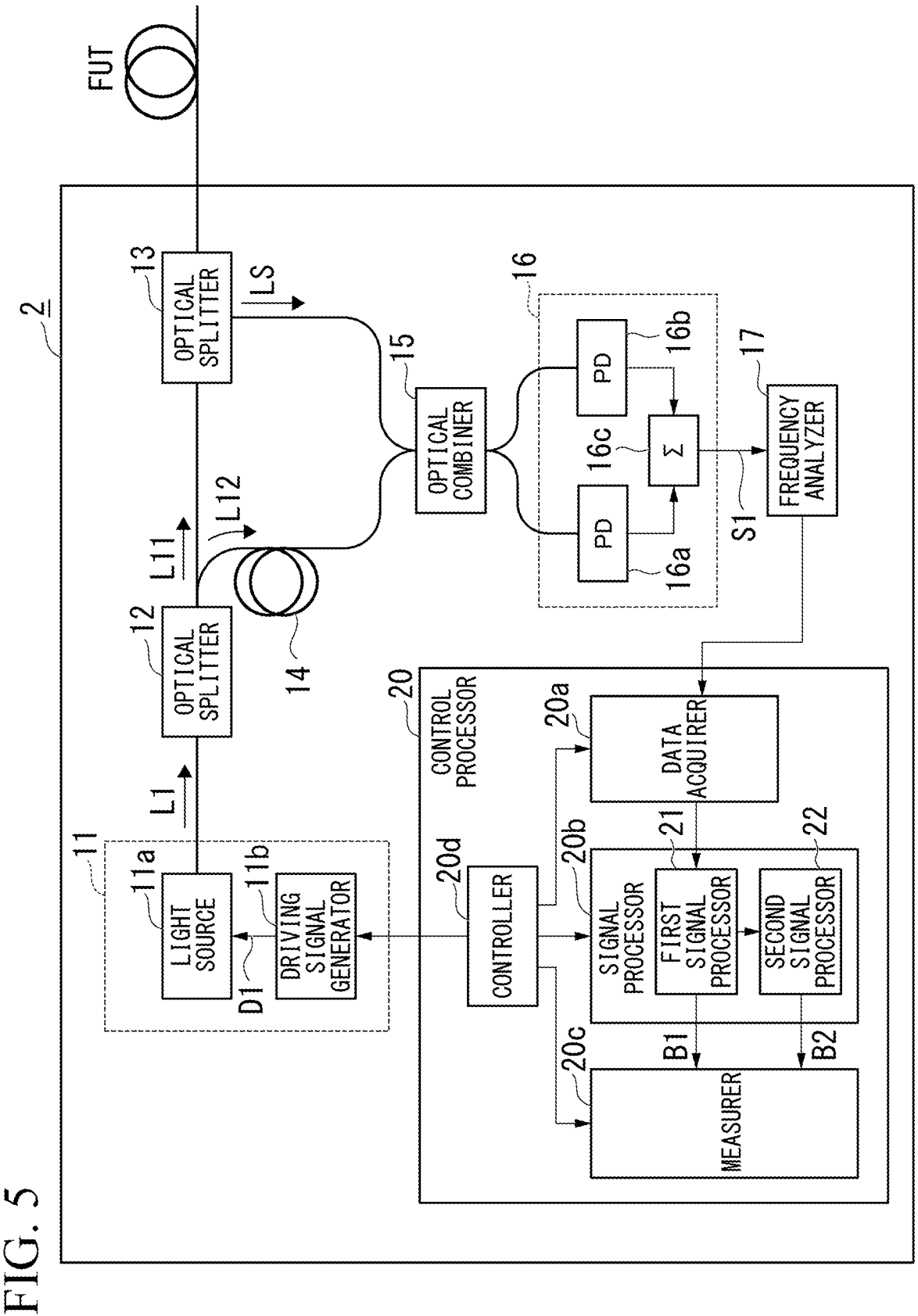
FIG. 5 is a block diagram illustrating main components of an optical fiber characteristic measurement device according to a second embodiment of the present invention.

FIG. 5 is a block diagram illustrating main components of an optical fiber characteristic measurement device according to a second embodiment of the present invention. Meanwhile, in FIG. 5, the same components as those shown in FIG. 1 are denoted by the same reference numerals. As shown in FIG. 5, an optical fiber characteristic measurement device 2 of the present embodiment has a configuration in which the signal generator 10 of the optical fiber characteristic measurement device 1 shown in FIG. 1 is omitted, and a control processor 20 is provided instead of the control processor 18.

The optical fiber characteristic measurement device 1 of the first embodiment described above is configured to sequentially cause the continuous light L1 (the pump light L11) having the first and second spectral widths to be incident on the optical fiber under test FUT, and to sequentially acquire the first Brillouin gain spectrum B1 and the second Brillouin gain spectrum B2. On the other hand, the optical fiber characteristic measurement device 2 of the present embodiment is configured to acquire the first Brillouin gain spectrum B1 by causing the continuous light L1 (the pump light L11) having the first spectral width to be incident on the optical fiber under test FUT, and to arithmetically obtain the second Brillouin gain spectrum B2 using the acquired first Brillouin gain spectrum B1.

Meanwhile, since the second Brillouin gain spectrum B2 obtained in the present embodiment is arithmetically obtained, it is strictly different from the second Brillouin gain spectrum B2 obtained in the first embodiment. The second Brillouin gain spectrum B2 obtained in the present embodiment is, so to speak, a Brillouin gain spectrum that would be obtained (expected to be obtained) in a case where the spectral width of light incident on the optical fiber under test FUT is the second spectral width.

The control processor 20 comprehensively controls the operation of the optical fiber characteristic measurement device 2, and uses the frequency analysis result of the frequency analyzer 17 to perform processing required for measuring the characteristics (such as, for example, strain distribution, temperature distribution, or vibration distribution) of the optical fiber under test FUT. The control processor 20 includes a data acquirer 20a, a signal processor 20b, a measurer 20c, and a controller 20d.

The data acquirer 20a acquires data which is output from the frequency analyzer 17 under the control of the controller 20d. Specifically, in a case where the continuous light L1 (the pump light L11) which is output from the light source unit 11 is incident on the optical fiber under test FUT, the data acquirer 20a acquires data indicating the Brillouin gain spectrum (the first Brillouin gain spectrum) which is output from the frequency analyzer 17. Meanwhile, the spectral width of the continuous light L1 (the pump light L11) which is output from the light source unit 11 is the first spectral width.

The signal processor 20b includes a first signal processor 21 and a second signal processor 22, and performs processing specified in advance on the data acquired by the data acquirer 20a under the control of the controller 20d. The first signal processor 21 obtains the first Brillouin gain spectrum acquired by the data acquirer 20a and stores or holds the spectrum. In addition, the first signal processor 21 may read out the stored first Brillouin gain spectrum and perform a process of drawing the read-out spectrum on a display device (not shown).

The second signal processor 22 performs a process of reading out the first Brillouin gain spectrum stored in the first signal processor 21 and using the read-out first Brillouin gain spectrum to obtain the second Brillouin gain spectrum. Specifically, the second signal processor 22 obtains the second Brillouin gain spectrum by performing a convolution operation on the first Brillouin gain spectrum read out from the first signal processor 21 and a unimodal spectrum. Meanwhile, the second signal processor 22 may perform a process of drawing the obtained second Brillouin gain spectrum on a display device (not shown).

Here, a unimodal spectrum that can dull the foreground light spectrum in the first Brillouin gain spectrum shown in FIG. 4A (reduce the signal intensity in the peak frequency fp1) and generally maintain the shape of the background light spectrum may be used for the convolution operation. Examples of such unimodal spectra include a Lorentzian spectrum, a Gaussian spectrum, a rectangular window-type spectrum, and the like.

The Lorentzian spectrum is close to a spectrum of laser light (the pump light L11) incident on the optical fiber under test FUT. The Gaussian spectrum is close to a spectrum of noise. In a case where the second Brillouin gain spectrum similar to the second Brillouin gain spectrum acquired in the first embodiment is obtained, it is desirable to use the Gaussian spectrum. It is desirable to use the rectangular window-type spectrum for ease of arithmetic operation.

The spectral width (for example, full width at half maximum) of the unimodal spectrum used in convolution operation is only required to be larger than the spectral width (for example, approximately 30 MHz) of the Brillouin scattered light. The spectral width of the unimodal spectrum is desirably approximately 2 to 4 times (for example, 100 MHz) the spectral width of the Brillouin scattered light.

The measurer 20c reads out the first Brillouin gain spectrum B1 stored in the first signal processor 21 and the second Brillouin gain spectrum B2 obtained by the second signal processor 22. The measurer 20c measures the characteristics of the optical fiber under test FUT on the basis of the first Brillouin gain spectrum B1 and the second Brillouin gain spectrum B2. Meanwhile, the internal configuration of the measurer 20c is the same as the internal configuration of the measurer 18c shown in FIG. 2.

The controller 20d comprehensively controls the operation of the optical fiber characteristic measurement device 2 by controlling the driving signal generator 11b of the light source unit 11, and the data acquirer 20a, the signal processor 20b, and the measurer 20c of the control processor 20. The controller 20d is obtained by removing the function of controlling the signal generator 10 shown in FIG. 1 from the controller 18d shown in FIG. 1.

The control processor 20 can be realized by a computer such as, for example, a personal computer similarly to the control processor 18 shown in FIG. 1. The functions of the control processor 20 are realized through software, for example, by installing a program for realizing these functions in a computer. That is, the functions of the control processor 20 are realized by software and hardware resources in cooperation.

The program for realizing the functions of the control processor 20 may be distributed in a state where it is recorded in a computer readable recording medium such as, for example, a CD-ROM or a DVD (registered trademark)-ROM, or may be distributed through a network such as the Internet. Meanwhile, the functions of the control processor 20 may be realized using hardware such as an FPGA, an LSI, or an ASIC.

<Operation of Optical Fiber Characteristic Measurement Device>

Figure 6:
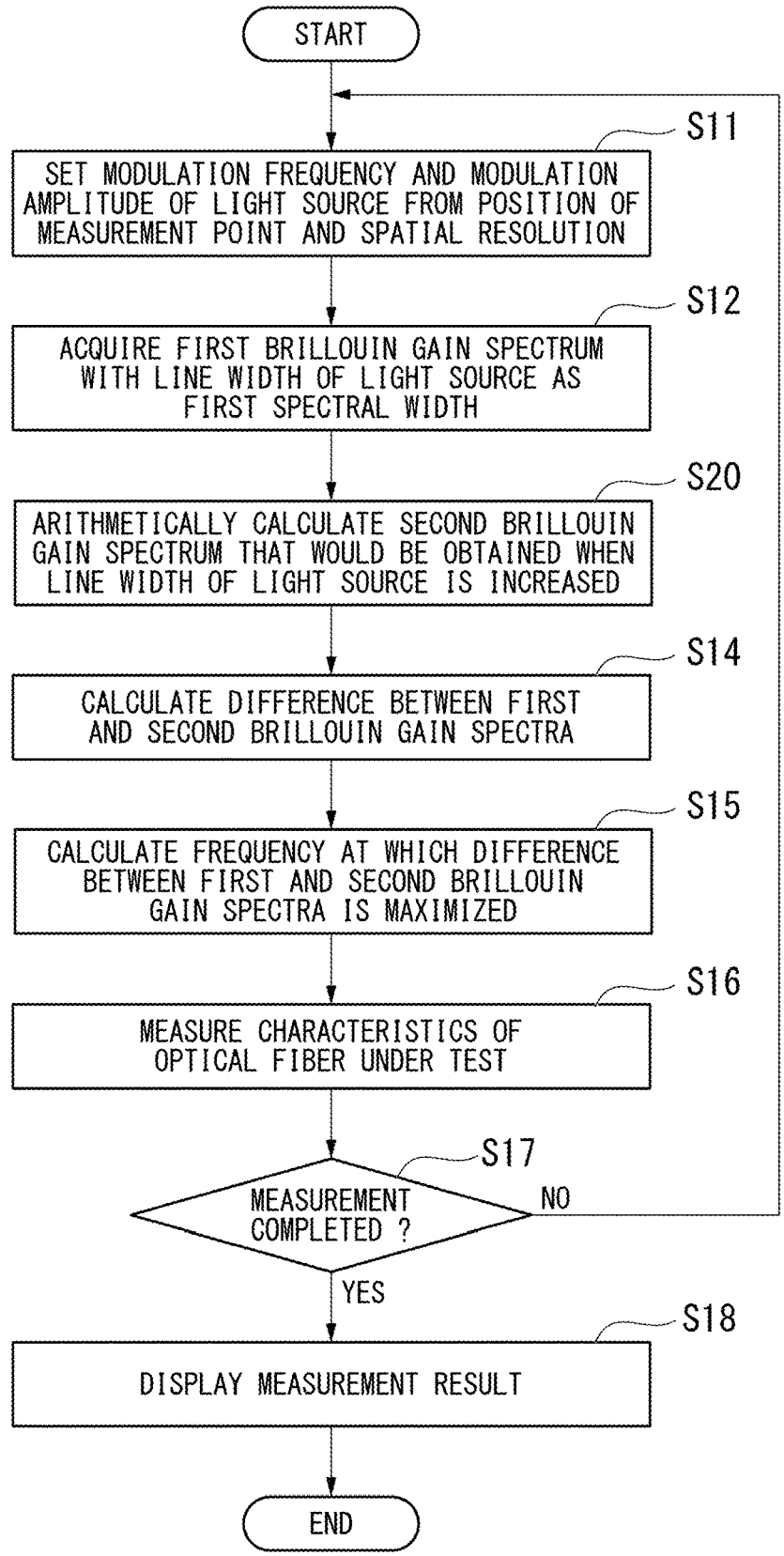
FIG. 6 is a flowchart illustrating an operation example of the optical fiber characteristic measurement device according to the second embodiment of the present invention.

FIG. 6 is a flowchart illustrating an operation example of the optical fiber characteristic measurement device according to the second embodiment of the present invention. Similarly to the flowchart shown in FIG. 3, the flowchart shown in FIG. 6 shows operations when the characteristics of the optical fiber under test FUT in its length direction are measured. Meanwhile, in FIG. 6, the same steps as the steps in the flowchart shown in FIG. 3 are denoted by the same reference numerals. The flowchart shown in FIG. 6 is provided with step S20 instead of step S13 in the flowchart shown in FIG. 3.

When the processing of the flowchart shown in FIG. 6 is started, first, a process of setting the modulation frequency fin and the modulation amplitude Δf of the light source 11a is performed from the position of a measurement point in the length direction of the optical fiber under test FUT and spatial resolution set in advance (step S11). This process is performed by the controller 20d of the control processor 20 with respect to the driving signal generator 11b of the light source unit 11. This process is performed, and thus the positions of the correlation peaks and intervals between the correlation peaks in the length direction of the optical fiber under test FUT are determined.

Next, a process of acquiring the first Brillouin gain spectrum B1 with the line width of the light source 11a as the first spectral width is performed under the control of the controller 20d (step S12). This process is the same as in the first embodiment except that the first Brillouin gain spectrum acquired by the data acquirer 20a is stored in the first signal processor 21, and thus the detailed description thereof will be omitted.

Next, a process of arithmetically obtaining the second Brillouin gain spectrum that would be obtained when the line width of the light source 11a is increased is performed by the second signal processor 22 (step S20). That is, a process of arithmetically obtaining the second Brillouin gain spectrum that would be obtained in a case where the spectral width of the continuous light L1 output from the light source unit 11 is the second spectrum in the first embodiment is performed. Specifically, the second signal processor 22 performs a process of reading out the first Brillouin gain spectrum stored in the first signal processor 21 and using the read-out first Brillouin gain spectrum to obtain the second Brillouin gain spectrum. More specifically, the second signal processor 22 performs a process of obtaining the second Brillouin gain spectrum by performing a convolution operation on the first Brillouin gain spectrum read out from the first signal processor 21 and a unimodal spectrum (for example, a Gaussian spectrum having a spectral width of 100 MHz).

When the above processing is completed, the measurer 20c performs a process of calculating a difference between the first Brillouin gain spectrum B1 and the second Brillouin gain spectrum B2 (step S14), calculating a frequency at which the calculated difference is maximized (step S15), and measuring the characteristics of the optical fiber under test FUT on the basis of the calculated frequency (step S16). When the above processing is completed, the controller 20d determines whether the measurement has been completed (step S17), and in a case where the measurement has not been completed (in the case of "NO"), the process returns to step S11. In a case where the measurement has been completed (in the case of "YES"), a process of displaying a measurement result is performed under the control of the controller 18d (step S18). With the above processing, a series of processes shown in FIG. 6 ends.

As described above, in the present embodiment, the first Brillouin gain spectrum B1 is acquired by causing the pump light L11 having the first spectral width to be incident on the optical fiber under test FUT, and the second Brillouin gain spectrum B2 is arithmetically obtained using the acquired first Brillouin gain spectrum B1. The characteristics of the optical fiber under test FUT are then measured on the basis of the first Brillouin gain spectrum B1 and the second Brillouin gain spectrum B2. This makes it possible to measure a large strain applied to the optical fiber under test FUT and temperature change without any error.

In addition, in the present embodiment, the second Brillouin gain spectrum B2 is arithmetically obtained, and thus unlike the first embodiment, it is not necessary to cause the pump light L11 having the second spectral width to be incident on the optical fiber under test FUT in order to obtain the second Brillouin gain spectrum B2. Therefore, it is possible to shorten a time required for measurement more than in the first embodiment. In addition, this can be dealt with just by changing software that realizes the function of the control processor 20 without adding hardware such as the signal generator 10.

Third Embodiment

<Configuration of Optical Fiber Characteristic Measurement Device>

Figure 7:
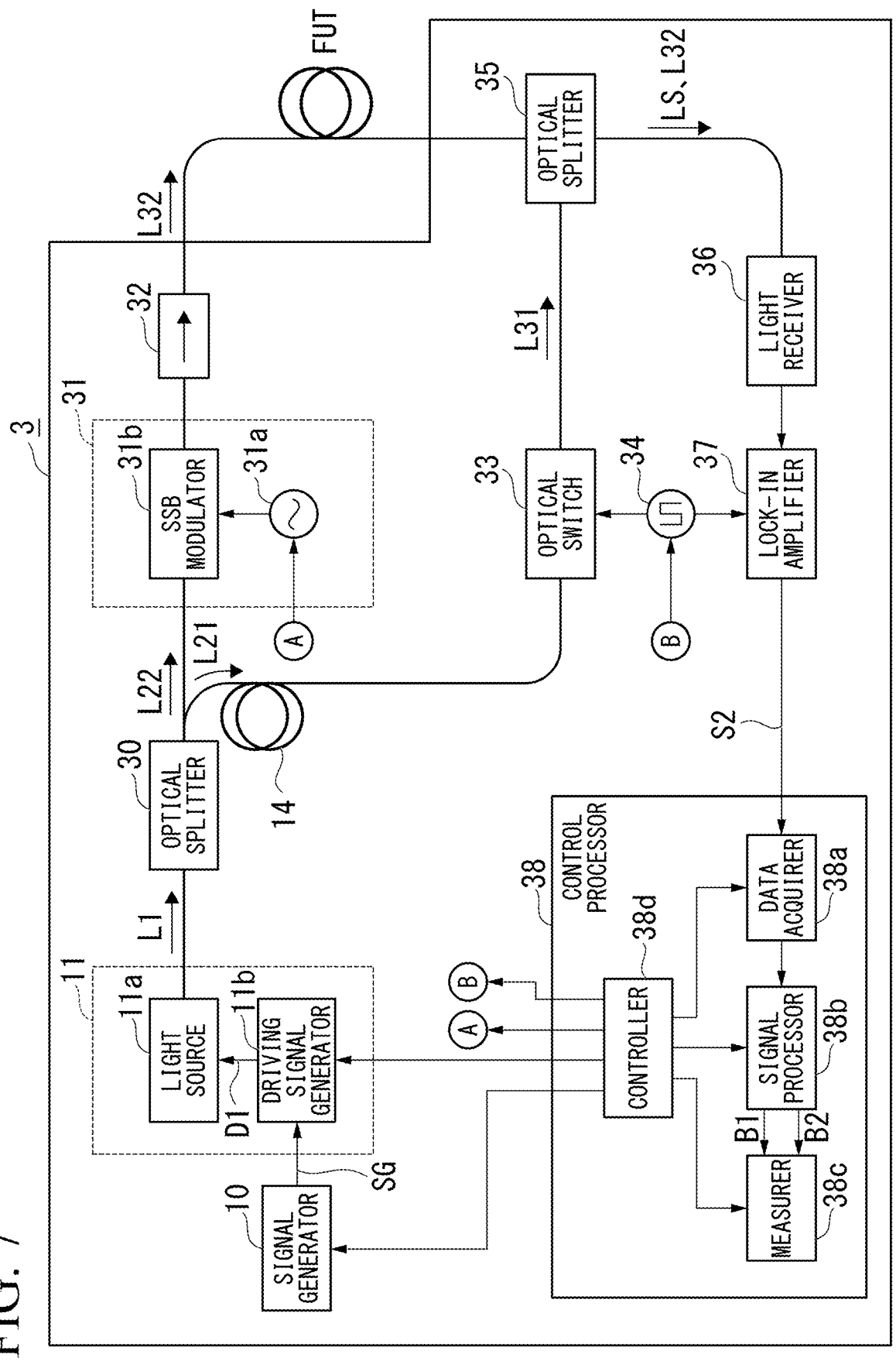
FIG. 7 is a block diagram illustrating main components of an optical fiber characteristic measurement device according to a third embodiment of the present invention.

FIG. 7 is a block diagram illustrating main components of an optical fiber characteristic measurement device according to a third embodiment of the present invention. Meanwhile, in FIG. 7, the same components as those shown in FIG. 1 are denoted by the same reference numerals. As shown in FIG. 7, an optical fiber characteristic measurement device 3 of the present embodiment includes the signal generator 10, the light source unit 11, an optical splitter 30 (third optical splitter), an optical frequency shifter 31 (shifter), an optical isolator 32, the optical delay 14, an optical switch 33, a synchronization signal source 34, an optical splitter 35 (fourth optical splitter), a light receiver 36 (light detector), a lock-in amplifier 37, and a control processor 38.

Such an optical fiber characteristic measurement device 3 is a so-called BOCDA (Brillouin Optical Correlation Domain Analysis)-type optical fiber characteristic measurement device that measures the characteristics of the optical fiber under test FUT on the basis of the Brillouin scattered light LS obtained by causing pump light L31 to be incident on one end of the optical fiber under test FUT and causing probe light L32 to be incident on the other end thereof. The above pump light L31 is pulsed light to which frequency modulation is applied. The above probe light L32 is continuous light to which the same frequency modulation as the pump light L31 is applied and to which a frequency shift is applied in a low-frequency direction with respect to the pump light L31. Meanwhile, in the present embodiment, for the purpose of simplifying the description, it is also assumed that only one correlation peak appears in the optical fiber under test FUT.

The signal generator 10 and the light source unit 11 are the same as those shown in FIG. 1. The optical splitter 30 splits the continuous light L1 output from the light source unit 11 into first split light L21 and second split light L22 having an intensity ratio (for example, 1:1) specified in advance. The optical frequency shifter 31 includes a sinusoidal signal source 31a and a single side band (SSB) modulator 31b, and shifts the frequency of the second split light L22 spilt by the optical splitter 30 by a frequency fb in a low-frequency direction under the control of the control processor 38 to obtain the probe light L32. Meanwhile, the frequency fb is not fixed and is changed (swept) by the control of the control processor 38.

The optical isolator 32 has an optical input end and an optical output end. The optical input end is connected to the optical frequency shifter 31, and the optical output end is connected to the other end of the optical fiber under test FUT. The optical isolator 32 transmits the probe light L32 which is input to the optical input end and outputs it from the optical output end, while blocking light which is input to the optical output end (for example, light which is output from the optical fiber under test FUT). That is, the optical isolator 32 transmits only the probe light L32 traveling from the optical frequency shifter 31 toward the optical fiber under test FUT.

The optical delay 14 is the same as that shown in FIG. 1. The optical switch 33 enters a connected state or a disconnected state in synchronization with a synchronization signal which is output from the synchronization signal source 34. In a case where the optical switch 33 is in a connected state, the first split light L21 spilt by the optical splitter 30 is output as the pump light L31 from the optical switch 33. On the other hand, in a case where the optical switch 33 is in a disconnected state, the pump light L31 is not output from the optical switch 33. The first split light L21 which is continuous light is pulsed by the optical switch 33 and is output as the pump light L31. The synchronization signal source 34 outputs a synchronization signal used by the optical switch 33 and the lock-in amplifier 37 under the control of the control processor 38.

The optical splitter 35 has a first port, a second port, and a third port. The first port is connected to the optical switch 33. The second port is connected to one end of the optical fiber under test FUT. The third port is connected to the light receiver 36. The optical splitter 35 outputs the pump light L31 which is input from the first port to the second port. In addition, the probe light L32 and the Brillouin scattered light LS from the optical fiber under test FUT which are input from the second port are output to the third port. Such an optical splitter 35 may be, for example, an optical circulator.

The light receiver 36 includes a light receiving element such as, for example, a photodiode, and receives the probe light L32 and the Brillouin scattered light LS which are output from the third port of the optical splitter 35. A light received signal corresponding to the result of receiver of the probe light L32 and the Brillouin scattered light LS is output from the light receiver 36.

Here, in a case where the optical switch 33 is in a connected state (in a case where the pump light L31 is output from the optical switch 33), the light receiver 36 receives the probe light L32 having passed through the optical fiber under test FUT and the Brillouin scattered light LS generated in the optical fiber under test FUT. Therefore, the above the probe light L32 and a light received signal corresponding to the Brillouin scattered light LS (hereinafter referred to as a "first light received signal") are output from the light receiver 36.

On the other hand, in a case where the optical switch 33 is in a disconnected state (in a case where the pump light L31 is not output from the optical switch 33), only the probe light L32 having passed through the optical fiber under test FUT is received by the light receiver 36. Therefore, a light received signal corresponding to the above the probe light L32 (hereinafter referred to as a "second light received signal") is output from the light receiver 36.

The lock-in amplifier 37 performs a process of obtaining the intensity of the Brillouin scattered light LS by sequentially acquiring the first light received signal and the second light received signal which are output from the light receiver 36 in synchronization with a synchronization signal for controlling the optical switch 33 and taking a difference between the first light received signal and the second light received signal. A detection signal S2 indicating the intensity of the Brillouin scattered light LS is output from the lock-in amplifier 37.

The control processor 38 comprehensively controls the operation of the optical fiber characteristic measurement device 3, and uses the detection result of the lock-in amplifier 37 to perform processing required for measuring the characteristics (such as, for example, strain distribution, temperature distribution, or vibration distribution) of the optical fiber under test FUT. The control processor 38 includes a data acquirer 38*a*, a signal processor 38*b*, a measurer 38*c*, and a controller 38*d*.

The data acquirer 38*a* acquires the detection signal S2 which is output from the lock-in amplifier 37 under the control of the controller 38*d*. Specifically, the data acquirer 38*a* sequentially acquires the detection signal S2 which is output from the lock-in amplifier 37 in a case where the continuous light L1 having the first spectral width is output from the light source unit 11 and the amount of frequency shift (frequency fb) of the probe light L32 is swept. In addition, the data acquirer 38*a* sequentially acquires the detection signal S2 which is output from the lock-in amplifier 37 in a case where the continuous light L1 having the second spectral width is output from the light source unit 11 and the amount of frequency shift (frequency fb) of the probe light L32 is swept.

The signal processor 38*b* performs a process of obtaining a Brillouin gain spectrum using the detection signal S2 acquired by the data acquirer 38*a* under the control of the controller 38*d*. Specifically, the signal processor 38*b* performs the process of obtaining a Brillouin gain spectrum by associating the detection signal S2 sequentially acquired by the data acquirer 38*a* with the amount of frequency shift (frequency fb) of the probe light L32. Here, the detection signal S2 which is acquired by the data acquirer 38*a* is a signal indicating the intensity of the Brillouin scattered light LS. On the other hand, the amount of frequency shift (frequency fb) of the probe light L32 indicates the frequency difference between the pump light L31 and the probe light L32. Thus, it is possible to obtain a Brillouin gain spectrum by associating these beams of light.

Meanwhile, in a case where the continuous light L1 having the first spectral width is output from the light source unit 11, the signal processor 38*b* obtains the first Brillouin gain spectrum by associating the detection signal S2 sequentially acquired by the data acquirer 38*a* with the amount of frequency shift (frequency fb) of the probe light L32. In addition, in a case where the continuous light L1 having the second spectral width is output from the light source unit 11, the signal processor 38*b* obtains the second Brillouin gain spectrum by associating the detection signal S2 sequentially acquired the data acquirer 38*a* with the amount of frequency shift (frequency fb) of the probe light L32.

The measurer 38*c* reads out the first Brillouin gain spectrum B1 and the second Brillouin gain spectrum B2 obtained by the signal processor 38*b*. The measurer 38*c* measures the characteristics of the optical fiber under test FUT on the basis of the first Brillouin gain spectrum B1 and the second Brillouin gain spectrum B2. Meanwhile, the internal configuration of the measurer 38*c* is the same as the internal configuration of the measurer 18*c* shown in FIG. 2.

The controller 38*d* comprehensively controls the operation of the optical fiber characteristic measurement device 3 by controlling the signal generator 10, the driving signal generator 11*b* of the light source unit 11, the sinusoidal signal source 31*a* of the optical frequency shifter 31, the synchronization signal source 34, and the data acquirer 38*a*, the signal processor 38*b*, and the measurer 38*c* of the control processor 38. This controller 38*d* is obtained by adding, so to speak, a function of controlling the sinusoidal signal source 31*a* and the synchronization signal source 34 to the controller 18*d* shown in FIG. 1.

The control processor 38 can be realized by a computer such as, for example, a personal computer similarly to the control processor 18 shown in FIG. 1. The functions of the control processor 38 are realized through software, for example, by installing a program for realizing these functions in a computer. That is, the functions of the control processor 38 are realized by software and hardware resources in cooperation.

The program for realizing the functions of the control processor 38 may be distributed in a state where it is recorded in a computer readable recording medium such as, for example, a CD-ROM or a DVD (registered trademark)-ROM, or may be distributed through a network such as the Internet. Meanwhile, the functions of the control processor 38 may be realized using hardware such as an FPGA, an LSI, or an ASIC.

<Operation of Optical Fiber Characteristic Measurement Device>

The optical fiber characteristic measurement device 3 of the present embodiment differs in measurement principle from the optical fiber characteristic measurement device 1 of the first embodiment, but generally operates in the same manner as the operation shown in the flowchart of FIG. 3. Therefore, the operation of the optical fiber characteristic measurement device 3 of the present embodiment will be described below with reference to FIG. 3.

When the processing of the flowchart shown in FIG. 3 is started, first, a process of setting the modulation frequency fm and the modulation amplitude Δf of the light source 11a is performed from the position of a measurement point in the length direction of the optical fiber under test FUT and spatial resolution set in advance (step S11). This process is performed by the controller 38d of the control processor 38 with respect to the driving signal generator 11b of the light source unit 11. This process is performed, and thus the positions of the correlation peaks and intervals between the correlation peaks in the length direction of the optical fiber under test FUT are determined.

Next, a process of acquiring the first Brillouin gain spectrum B1 with the line width of the light source 11a as the first spectral width is performed under the control of the controller 38d (step S12). When this process is started, the controller 38d first performs a process of setting the initial value of the amount of frequency shift (frequency fb) given to the probe light L32 by the optical frequency shifter 31 to the sinusoidal signal source 31a. Next, the driving signal generator 11b is controlled by the controller 38d, and the driving signal D1 is output from the driving signal generator 11b to the light source 11a. Meanwhile, here, the signal generator 10 is not controlled, and the signal SG is not output.

When the driving signal D1 is input to the light source 11a, the light source 11a outputs the continuous light L1 having the first spectral width which is frequency-modulated at the modulation frequency fm. The continuous light L1 output from the light source 11a is incident on the optical splitter 30 and is spilt into the first split light L21 and the second split light L22. The spilt second split light L22 is incident on the optical frequency shifter 31 and has its frequency shifted by the frequency fb to become the probe light L32. This probe light L32 is incident on the optical fiber under test FUT from the other end of the optical fiber under test FUT through the optical isolator 32, and propagates through the optical fiber under test FUT.

In addition, the spilt first split light L21 is incident on the optical switch 33 through the optical delay 14. In a case where the optical switch 33 is in a connected state, the first split light L21 incident on the optical switch 33 is output from the optical switch 33 as the pump light L31. The pump light L31 output from the optical switch 33 is incident on the optical fiber under test FUT from one end of the optical fiber under test FUT through the optical splitter 35, and propagates through the optical fiber under test FUT.

As the pump light L31 and the probe light L32 propagate in opposite directions in the optical fiber under test FUT, the Brillouin scattered light LS (backscattered light) is sequentially generated in the optical fiber under test FUT. The Brillouin scattered light LS generated in the optical fiber under test FUT propagates in a direction opposite to the direction in which the pump light L31 propagates, and is emitted from one end of the optical fiber under test FUT together with the probe light L32 having passed through the optical fiber under test FUT. The probe light L32 and the Brillouin scattered light LS emitted from one end of the optical fiber under test FUT pass through the optical splitter 35 and then are received by the light receiver 36, and the first light received signal is output from the light receiver 36. This first light received signal is acquired by the lock-in amplifier 37.

Next, when the optical switch 33 enters a disconnected state, the pump light L31 is not output from the optical switch 33. Then, only the probe light L32 having passed through the optical fiber under test FUT is emitted from one end of the optical fiber under test FUT. The probe light L32 emitted from one end of the optical fiber under test FUT passes through the optical splitter 35 and then is received by the light receiver 36, and the second light received signal is output from the light receiver 36. This second light received signal is acquired by the lock-in amplifier 37.

When the first light received signal and the second light received signal are acquired, the lock-in amplifier 37 obtains a difference between the first light received signal and the second light received signal to perform a process of obtaining the intensity of the Brillouin scattered light LS. When this process is performed, the detection signal S2 indicating the intensity of the Brillouin scattered light LS is output from the lock-in amplifier 37. This detection signal S2 is acquired by the data acquirer 38a of the control processor 38 and is stored in the signal processor 38b.

When the above processing is completed, the sinusoidal signal source 31a is controlled by the controller 38d, and the same operation as the above-described operation is repeatedly performed while the optical frequency shifter 31 sequentially changes (sweeps) the amount of frequency shift (frequency fb) given to the probe light L32. When the sweep of the amount of frequency shift (frequency fb) given to the probe light L32 is completed, the signal processor 38b performs a process of obtaining the first Brillouin gain spectrum. Specifically, the signal processor 38b performs the process of obtaining the first Brillouin gain spectrum by associating the amount of frequency shift (frequency fb) of the probe light L32 with the detection signal S2 sequentially stored in the signal processor 38b.

Next, a process of acquiring the second Brillouin gain spectrum B2 with the line width of the light source 11a as the second spectral width is performed under the control of the controller 38d (step S13). This process is the same as the process which is performed in step S12 except for the following two points. Therefore, the detailed description of the process which is performed in step S13 will be omitted.

The point that the signal generator 10 is controlled by the controller 38d in addition to the driving signal generator 11b, and the continuous light L1 having the second spectral width which is frequency-modulated at the modulation frequency fm is output from the light source 11a.

The point that the signal processor 38b performs a process of obtaining the second Brillouin gain spectrum instead of the first Brillouin gain spectrum.

Next, the measurer 38c performs a process of calculating a difference between the first Brillouin gain spectrum B1 and the second Brillouin gain spectrum B2 (step S14), calculating a frequency at which the calculated difference is maximized (step S15), and measuring the characteristics of the optical fiber under test FUT on the basis of the calculated frequency (step S16). When the above processing is completed, the controller 38d determines whether the measurement has been completed (step S17), and in a case where the measurement has not been completed (in the case of "NO"), the process returns to step S11. In a case where the measurement has been completed (in the case of "YES"), a process of displaying a measurement result is performed under the control of the controller 38d (step S18). With the above processing, a series of processes shown in FIG. 3 ends.

As described above, in the present embodiment, the first Brillouin gain spectrum B1 is acquired by causing the pump light L31 having the first spectral width to be incident on the optical fiber under test FUT, and the second Brillouin gain spectrum B2 is acquired by causing the pump light L31 having the second spectral width to be incident on the optical fiber under test FUT. The characteristics of the optical fiber under test FUT are then measured on the basis of the first Brillouin gain spectrum B1 and the second Brillouin gain spectrum B2. This makes it possible to measure a large strain applied to the optical fiber under test FUT and temperature change without any error.

Fourth Embodiment

<Configuration of Optical Fiber Characteristic Measurement Device>

Figure 8:
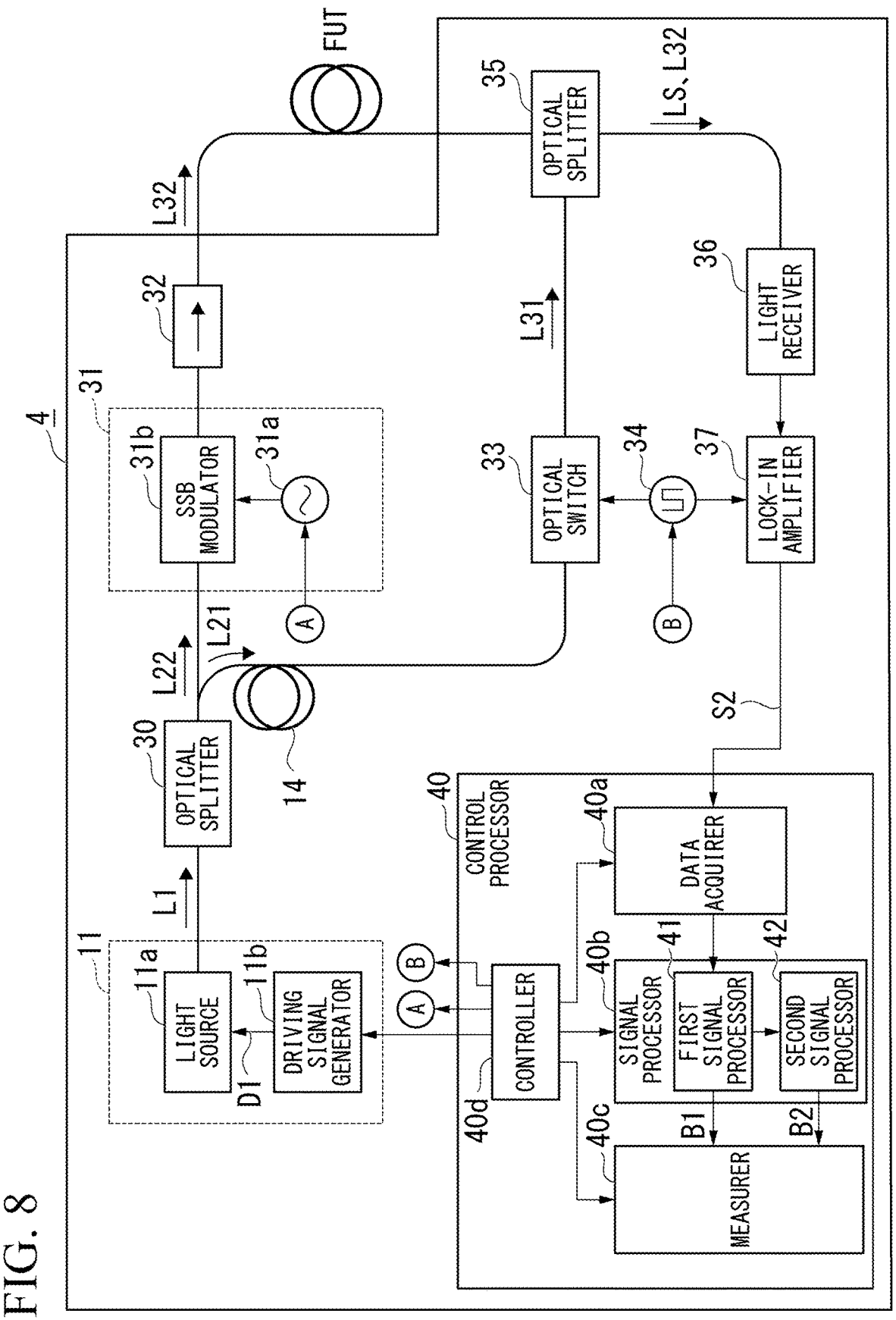
FIG. 8 is a block diagram illustrating main components of an optical fiber characteristic measurement device according to a fourth embodiment of the present invention.

FIG. 8 is a block diagram illustrating main components of an optical fiber characteristic measurement device according to a fourth embodiment of the present invention. Meanwhile, in FIG. 8, the same components as those shown in FIG. 7 are denoted by the same reference numerals. As shown in FIG. 8, an optical fiber characteristic measurement device 4 of the present embodiment has a configuration in which the signal generator 10 of the optical fiber characteristic measurement device 3 shown in FIG. 7 is omitted, and a control processor 40 is provided instead of the control processor 38.

The optical fiber characteristic measurement device 3 of the third embodiment described above is configured to sequentially cause the continuous light L1 (the pump light L31) having the first and second spectral widths to be incident on the optical fiber under test FUT, and to sequentially acquire the first Brillouin gain spectrum B1 and the second Brillouin gain spectrum B2, similarly to the optical fiber characteristic measurement device 1 of the first embodiment. On the other hand, similarly to the optical fiber characteristic measurement device 2 of the second embodiment, the optical fiber characteristic measurement device 4 of the present embodiment acquires the first Brillouin gain spectrum B1 by causing the continuous light L1 (the pump light L31) having the first spectral width to be incident on the optical fiber under test FUT, and arithmetically obtains the second Brillouin gain spectrum B2 using the acquired first Brillouin gain spectrum B1.

Meanwhile, since the second Brillouin gain spectrum B2 obtained in the present embodiment is arithmetically obtained, it is strictly different from the second Brillouin gain spectrum B2 obtained in the third embodiment. The second Brillouin gain spectrum B2 obtained in the present embodiment is, so to speak, a Brillouin gain spectrum that would be obtained (expected to be obtained) in a case where the spectral width of light incident on the optical fiber under test FUT is the second spectral width.

The control processor 40 comprehensively controls the operation of the optical fiber characteristic measurement device 4, and uses the detection result of the lock-in amplifier 37 to perform processing required for measuring the characteristics (such as, for example, strain distribution, temperature distribution, or vibration distribution) of the optical fiber under test FUT. The control processor 40 includes a data acquirer 40a, a signal processor 40b, a measurer 40c, and a controller 40d.

The data acquirer 40a acquires the detection signal S2 which is output from the lock-in amplifier 37 under the control of the controller 40d. Specifically, in a case where the continuous light L1 having the first spectral width is output from the light source unit 11 and the amount of frequency shift (frequency fb) of the probe light L32 is swept, the data acquirer 40a sequentially acquires the detection signal S2 which is output from the lock-in amplifier 37. In addition, in a case where the continuous light L1 having the first spectral width is output from the light source unit 11 and the amount of frequency shift (frequency fb) of the probe light L32 is swept, the data acquirer 40a sequentially acquires the detection signal S2 which is output from the lock-in amplifier 37.

The signal processor 40b includes a first signal processor 41 and a second signal processor 42, and performs a process of obtaining a Brillouin gain spectrum using the detection signal S2 acquired by the data acquirer 40a under the control of the controller 40d. In a case where the continuous light L1 having the first spectral width is output from the light source unit 11, the first signal processor 41 performs a process of obtaining the first Brillouin gain spectrum by associating the amount of frequency shift (frequency fb) of the probe light L32 with the detection signal S2 sequentially acquired by the data acquirer 40a.

The second signal processor 42 performs a process of reading out the first Brillouin gain spectrum obtained by the first signal processor 41 and using the read-out first Brillouin gain spectrum to obtain the second Brillouin gain spectrum. Specifically, the second signal processor 42 performs a process of obtaining the second Brillouin gain spectrum by performing a convolution operation on the first Brillouin gain spectrum read out from the first signal processor 41 and a unimodal spectrum.

Here, similarly to the second embodiment, the unimodal spectrum used for the convolution operation may be able to dull the foreground light spectrum (reduce the signal intensity in the peak frequency fp1) in the first Brillouin gain spectrum shown in FIG. 4A and generally maintain the shape of the background light spectrum. Examples of such unimodal spectra include a Lorentzian spectrum, a Gaussian spectrum, a rectangular window-type spectrum, and the like.

The spectral width (for example, full width at half maximum) of the unimodal spectrum used in convolution operation is only required to be larger than the spectral width (for example, approximately 30 MHz) of the Brillouin scattered light. The spectral width of the unimodal spectrum is desirably approximately 2 to 4 times (for example, 100 MHz) the spectral width of the Brillouin scattered light.

The measurer 40c reads out the first Brillouin gain spectrum B1 obtained by the first signal processor 41 and the second Brillouin gain spectrum B2 obtained by the second signal processor 42. The measurer 40c measures the characteristics of the optical fiber under test FUT on the basis of the first Brillouin gain spectrum B1 and the second Brillouin gain spectrum B2. Meanwhile, the internal configuration of the measurer 40c is the same as the internal configuration of the measurer 18c shown in FIG. 2.

The controller 40d comprehensively controls the operation of the optical fiber characteristic measurement device 4 by controlling the driving signal generator 11b of the light source unit 11, the sinusoidal signal source 31a of the optical frequency shifter 31, the synchronization signal source 34, and the data acquirer 40a, the signal processor 40b, and the measurer 40c of the control processor 40. This controller 40d is obtained by removing the function of controlling the signal generator 10 shown in FIG. 7 from the controller 38d shown in FIG. 7.

The control processor 40 can be realized by a computer such as, for example, a personal computer similarly to the control processor 38 shown in FIG. 3. The functions of the control processor 40 are realized through software, for example, by installing a program for realizing these functions in a computer. That is, the functions of the control processor 40 are realized by software and hardware resources in cooperation.

The program for realizing the functions of the control processor 40 may be distributed in a state where it is recorded in a computer readable recording medium such as, for example, a CD-ROM or a DVD (registered trademark)-ROM, or may be distributed through a network such as the Internet. Meanwhile, the functions of the control processor 40 may be realized using hardware such as an FPGA, an LSI, or an ASIC.

<Operation of Optical Fiber Characteristic Measurement Device>

The optical fiber characteristic measurement device 4 of the present embodiment differs in measurement principle from the optical fiber characteristic measurement device 2 of the second embodiment, but generally operates in the same manner as the operation shown in the flowchart of FIG. 6. Therefore, the operation of the optical fiber characteristic measurement device 4 of the present embodiment will be described below with reference to FIG. 6.

When the processing of the flowchart shown in FIG. 6 is started, first, a process of setting the modulation frequency fm and the modulation amplitude Δf of the light source 11a is performed from the position of a measurement point in the length direction of the optical fiber under test FUT and spatial resolution set in advance (step S11). This process is performed by the controller 40d of the control processor 40 with respect to the driving signal generator 11b of the light source unit 11. This process is performed, and thus the positions of the correlation peaks and intervals between the correlation peaks in the length direction of the optical fiber under test FUT are determined.

Next, a process of acquiring the first Brillouin gain spectrum B1 with the line width of the light source 11a as the first spectral width is performed under the control of the controller 40d (step S12). This process is the same as in the third embodiment except that the detection signal S2 acquired by the data acquirer 40a is stored in the first signal processor 41, and thus the detailed description thereof will be omitted.

Next, a process of arithmetically obtaining the second Brillouin gain spectrum that would be obtained when the line width of the light source 11a is increased is performed by the second signal processor 42 (step S20). Specifically, the second signal processor 42 performs a process of reading out the first Brillouin gain spectrum stored in the first signal processor 41 and using the read-out first Brillouin gain spectrum to obtaining the second Brillouin gain spectrum. More specifically, the second signal processor 42 performs a process of obtaining the second Brillouin gain spectrum by performing a convolution operation on the first Brillouin gain spectrum read out from the first signal processor 41 and a unimodal spectrum (for example, a Gaussian spectrum having a spectral width of 100 MHz).

When the above processing is completed, the measurer 40c performs a process of calculating a difference between the first Brillouin gain spectrum B1 and the second Brillouin gain spectrum B2 (step S14), calculating a frequency at which the calculated difference is maximized (step S15), and measuring the characteristics of the optical fiber under test FUT on the basis of the calculated frequency (step S16). When the above processing is completed, the controller 40d determines whether the measurement has been completed (step S17), and in a case where the measurement has not been completed (in the case of "NO"), the process returns to step S11. In a case where the measurement has been completed (in the case of "YES"), a process of displaying a measurement result is performed under the control of the controller 18d (step S18). With the above processing, a series of processes shown in FIG. 6 ends.

As described above, in the present embodiment, the first Brillouin gain spectrum B1 is acquired by causing the pump light L11 having the first spectral width to be incident on the optical fiber under test FUT, and the second Brillouin gain spectrum B2 is arithmetically obtained using the acquired first Brillouin gain spectrum B1. The characteristics of the optical fiber under test FUT are then measured on the basis of the first Brillouin gain spectrum B1 and the second Brillouin gain spectrum B2. This makes it possible to measure a large strain applied to the optical fiber under test FUT and temperature change without any error.

In addition, in the present embodiment, the second Brillouin gain spectrum B2 is arithmetically obtained, and thus unlike the first embodiment, it is not necessary to cause the pump light L11 having the second spectral width to be incident on the optical fiber under test FUT in order to obtain the second Brillouin gain spectrum B2. Therefore, it is possible to shorten a time required for measurement more than in the first embodiment. In addition, this can be dealt with just by changing software that realizes the function of the control processor 40 without adding hardware such as the signal generator 10.

Hereinbefore, although the optical fiber characteristic measurement device, the optical fiber characteristic measurement program, and the optical fiber characteristic measurement method according to the embodiment of the present invention have been described, the present invention is not limited to the above embodiment, and can be freely changed within the scope of the present invention.

For example, in the above first and third embodiments, the light source 11a including a distributed feedback laser diode is caused to output the continuous light L1 having the first spectral width by supplying the driving signal D1 on which the signal SG is not superimposed, and to output the continuous light L1 having the second spectral width by supplying the driving signal D1 on which the signal SG is superimposed. However, the continuous light L1 having the first spectral width or the continuous light L1 having the second spectral width may be output by adjusting the frequency or phase of the driving current of the light source 11a including a distributed Bragg reflector laser diode (DBR-LD).

Alternatively, an optical frequency shifter (not shown) may be provided between the light source 11a and the optical splitter 30 to transmit the continuous light L1 having the first spectral width output from the light source 11a as it is or to convert it into the continuous light L1 having the second spectral width. Meanwhile, the above optical frequency shifter may be, for example, an SSB modulator. Alternatively, the optical frequency shifter may be composed of a combination of an intensity modulator and an optical filter.

In addition, although optical heterodyne detection is performed by the light detector 16 in the above-described first and second embodiment, optical homodyne detection may be performed. That is, a frequency shift which is approximately the same as the amount of Brillouin frequency shift may be given to the pump light L11 or the reference light L12 to perform detection by reducing the frequency difference between the Brillouin scattered light LS and the reference light L12 (or setting the frequency difference to zero). Meanwhile, in a case where the frequency difference between the Brillouin scattered light LS and the reference light L12 is reduced, it is desirable to use a low-frequency ESA as the frequency analyzer 17. In addition, in a case where the frequency difference between the Brillouin scattered light LS and the reference light L12 is set to zero, it is desirable to omit the frequency analyzer 17 and to sweep the amount of frequency shift given to the pump light L11 or the reference light L12.

In addition, the optical splitter 12 in the first and second embodiments described above and the optical splitter 30 in the third and fourth embodiments described above may split the continuous light L1 at the same intensity ratio or at different intensity ratios. The split ratios of the optical splitter 12 and the optical splitter 30 may be set in consideration of the allowable input intensity of the following optical system. In addition, in a case where the optical splitter 12 and the optical splitter 30 split the continuous light L1 at different intensity ratios, light having a low intensity in the spilt light may be amplified by an optical amplifier or the like.

In addition, in the above-described third and fourth embodiments, an example in which the frequency of the second split light L22 (the probe light L32) is shifted in a low-frequency direction by the optical frequency shifter 31 provided between the optical splitter 30 and the optical isolator 32 has been described. However, the optical frequency shifter 31 may be provided between the optical splitter 30 and the optical switch 33 to shift the frequency of the first split light L21 (the pump light L31) in a high-frequency direction.

In addition, although the optical delay 14 is provided between the optical splitter 12 and the optical combiner 15 in the above-described first and second embodiments, the optical delay 14 may be provided between the optical splitter 12 and the optical splitter 13 or between the optical splitter 13 and the optical combiner 15. Similarly, although the optical delay 14 is provided between the optical splitter 12 and the optical switch 33 in the above-described third and fourth embodiments, the optical delay 14 may be provided between the optical splitter 12 and the optical frequency shifter 31 or between the optical frequency shifter 31 and the optical isolator 32.

In addition, in the above embodiment, for the purpose of simplifying the description, only one correlation peak is assumed to appear in the optical fiber under test FUT. In a case where a plurality of correlation peaks appear in the optical fiber under test FUT, it is only required that one of a plurality of correlation peaks are selected using, for example, a method called a double modulation method or a method called a time gate method, and that only a Brillouin scattered light at a position where the selected correlation peak appear is extracted.

In this specification, terms representing directions such as "front, rear, upper, lower, right, left, vertical, horizontal, longitudinal, transverse, row, and column" refer to such directions in a device of the present invention. Therefore, these terms in the specification of the present invention should be construed relatively in a device of the present invention.

A term such as "configured" is configured in order to execute functions of the present invention, or is used in order to represent a configuration, an element, or a portion of a device.

Further, the wording represented as "means plus function" in the claims should include every structure capable of being used in order to execute functions included in the present invention.

A term such as "unit" is used for representing a portion of software programmed in order to execute a component, a unit, hardware, or a desired function. A typical example of hardware is a device or a circuit, but is not limited thereto.

Hereinbefore, although preferred examples of the present invention have been described, the present invention is not limited to the examples. Additions, omissions, substitutions, and other changes of components can be made without departing from the spirit or scope of the present invention. The present invention is not limited by the above description, but is limited by only the appended claims.

REFERENCE SIGNS LIST 1 to 4 Optical fiber characteristic measurement device
10 Signal generator
11 Light source unit
11a Light source
11b Driving signal generator
12, 13 Optical splitter
14 Optical delay
15 Optical combiner
16 Light detector
17 Frequency analyzer
18, 20 Control processor
18a, 20a Data acquirer
18b, 20b Signal processor
18c, 20c Measurer
18d, 20d Controller
19a Difference calculator
19b Characteristic measurer
21 First signal processor
22 Second signal processor
30 Optical splitter
31 Optical frequency shifter
32 Optical isolator
33 Optical switch
34 Synchronization signal source
35 Optical splitter
36 Light receiver
37 Lock-in amplifier
38, 40 Control processor
38a, 40a Data acquirer
38b, 40b Signal processor
38c, 40c Measurer
38d, 40d Controller
41 First signal processor
42 Second signal processor
B1 First Brillouin gain spectrum
B2 Second Brillouin gain spectrum
D1 Driving signal
FUT Optical fiber under test
L1 Continuous light
L11 Pump light
L12 Reference light
L21 First split light
L22 Second split light
L31 Pump light
L32 Probe light
LS Brillouin scattered light
S1, S2 Detection signal

The invention claimed is:
1. An optical fiber characteristic measurement device comprising:
a light detector configured to detect Brillouin scattered light obtained by causing light to be incident on an optical fiber;
a signal processor that is realized by a computer and configured to obtain, on the basis of a detection signal which is output from the light detector, a first Brillouin gain spectrum which is a spectrum of the Brillouin scattered light obtained in a case where a spectral width of the light incident on the optical fiber is a first width and a second Brillouin gain spectrum which is a spectrum of the Brillouin scattered light obtained in a case where the spectral width of the light incident on the optical fiber is a second width larger than the first width; and a measurer that is realized by the computer and configured to obtain a difference between the first Brillouin gain spectrum and the second Brillouin gain spectrum, and measure characteristics of the optical fiber by obtaining an amount of Brillouin frequency shift from a frequency at which a magnitude of the difference is maximized.

2. The optical fiber characteristic measurement device according to claim 1,
wherein the second width is larger than a spectral width of the Brillouin scattered light obtained from the optical fiber.

3. The optical fiber characteristic measurement device according to claim 1, further comprising:
a light source unit including a semiconductor laser element and configured to emit light which is incident on the optical fiber and of which a spectral width is the first width or of which a spectral width is the second width.

4. The optical fiber characteristic measurement device according to claim 3,
wherein the light source unit further comprises:
a light source driven by a driving signal to emit light of which a spectral width is the first width; and
a modulator configured to process the driving signal to set the spectral width of the light emitted from the light source to the second width or to modulate the light emitted from the light source to set the spectral width to the second width.

5. The optical fiber characteristic measurement device according to claim 3, further comprising:
a controller that is realized by the computer and configured to cause the signal processor to acquire the first Brillouin gain spectrum by causing the light source unit to emit the light of which the spectral width is the first width, and configured to cause the signal processor to acquire the second Brillouin gain spectrum by causing the light source unit to emit the light of which the spectral width is the second width.

6. The optical fiber characteristic measurement device according to claim 1, further comprising:
a light source unit including a semiconductor laser element and configured to emit light which is incident on the optical fiber and of which a spectral width is the first width,
wherein the signal processor comprises:
a first signal processor that is realized by the computer and configured to obtain the first Brillouin gain spectrum on the basis of a detection signal which is output from the light detector in a case where the light emitted from the light source unit is incident on the optical fiber; and
a second signal processor that is realized by the computer and configured to use the first Brillouin gain spectrum obtained by the first signal processor to obtain the second Brillouin gain spectrum to be obtained in a case where the spectral width of the light incident on the optical fiber is the second width.

7. The optical fiber characteristic measurement device according to claim 6,
wherein the second signal processor is configured to obtain the second Brillouin gain spectrum by performing a convolution operation on the first Brillouin gain spectrum obtained by the first signal processor and a unimodal spectrum.

8. The optical fiber characteristic measurement device according to claim 1, further comprising:
a first optical splitter configured to split frequency-modulated light into pump light and reference light; and
a second optical splitter configured to cause the pump light to be incident from one end of the optical fiber into the optical fiber, and configured to output the Brillouin scattered light generated in the optical fiber,
wherein the light detector is configured to detect interference light between the Brillouin scattered light and the reference light.

9. The optical fiber characteristic measurement device according to claim 1, further comprising:
a third optical splitter configured to split frequency-modulated light into first split light and second split light;
a shifter configured to shift a frequency of the first split light or the second split light;
an optical switch configured to switch whether the first split light is output as pump light or not; and
a fourth optical splitter configured to cause the pump light which is output from the optical switch to be incident from one end of the optical fiber into the optical fiber and configured to output probe light as the second split light which is incident from the other end of the optical fiber and passes through the optical fiber and the Brillouin scattered light generated in the optical fiber,
wherein the light detector is configured to detect the Brillouin scattered light from a difference between the Brillouin scattered light and the probe light which are output from the fourth optical splitter in a case where the pump light is output from the optical switch and the probe light which is output from the fourth optical splitter in a case where the pump light is not output from the optical switch.

10. The optical fiber characteristic measurement device according to claim 8, further comprising:
an optical delay configured to delay the reference light or the pump light spilt by the first optical splitter by a predetermined time.

11. The optical fiber characteristic measurement device according to claim 10, further comprising:
an optical combiner configured to combine the Brillouin scattered light with the reference light.

12. The optical fiber characteristic measurement device according to claim 11,
wherein the optical combiner is configured to split the combined light into first light and second light of an intensity ratio specified in advance, and configured to output the first light and the second light to the light detector.

13. The optical fiber characteristic measurement device according to claim 12,
wherein the light detector comprises:
a first photodiode configured to receive the first light which is output from the optical combiner, and configured to output a first light received signal;
a second photodiode configured to receive the second light which is output from the optical combiner, and configured to output a second light received signal; and
an adder configured to output the detection signal indicating a frequency difference between the Brillouin scattered light and the reference light on the basis of the first light received signal and the second light received signal.

14. The optical fiber characteristic measurement device according to claim 13, further comprising:
   a frequency analyzer configured to output the first Brillouin gain spectrum and the second Brillouin gain spectrum by performing frequency analysis on the detection signal which is output from the adder; and
   a data acquirer that is realized by the computer and configured to acquire the first Brillouin gain spectrum and the second Brillouin gain spectrum which are output from the frequency analyzer,
   wherein the signal processor stores the first Brillouin gain spectrum and the second Brillouin gain spectrum acquired by the data acquirer, and
   wherein the measurer is configured to read out the first Brillouin gain spectrum and the second Brillouin gain spectrum stored in the signal processor, and configured to measure the characteristics of the optical fiber on the basis of the first Brillouin gain spectrum and the second Brillouin gain spectrum.

15. The optical fiber characteristic measurement device according to claim 5, further comprising:
   a signal generator configured to generate a specific signal,
   wherein the controller does not cause the signal generator to output the specific signal in a case where the light of which the spectral width is the first width is emitted from the light source, and causes the signal generator to output the specific signal in a case where the light of which the spectral width is the second width is emitted from the light source.

16. The optical fiber characteristic measurement device according to claim 15,
   wherein the modulator is configured to generate the driving signal on which the specific signal is superimposed in a case where the specific signal is output from the signal generator.

17. A non-transitory computer readable storage medium storing an optical fiber characteristic measurement program for causing a computer to execute:
   a signal processing step of obtaining, on the basis of a detection signal obtained by detecting Brillouin scattered light obtained by causing light to be incident on an optical fiber, a first Brillouin gain spectrum which is a spectrum of the Brillouin scattered light obtained in a case where a spectral width of the light incident on the optical fiber is a first width and a second Brillouin gain spectrum which is a spectrum of the Brillouin scattered light obtained in a case where the spectral width of the light incident on the optical fiber is a second width larger than the first width; and
   a measurement step of obtaining a difference between the first Brillouin gain spectrum and the second Brillouin gain spectrum, and measuring characteristics of the optical fiber by obtaining an amount of Brillouin frequency shift from a frequency at which a magnitude of the difference is maximized.

18. An optical fiber characteristic measurement method comprising:
   a signal processing step of obtaining, on the basis of a detection signal obtained by detecting Brillouin scattered light obtained by causing light to be incident on an optical fiber, a first Brillouin gain spectrum which is a spectrum of the Brillouin scattered light obtained in a case where a spectral width of the light incident on the optical fiber is a first width and a second Brillouin gain spectrum which is a spectrum of the Brillouin scattered light obtained in a case where the spectral width of the light incident on the optical fiber is a second width larger than the first width; and
   a measurement step of obtaining a difference between the first Brillouin gain spectrum and the second Brillouin gain spectrum, and measuring characteristics of the optical fiber by obtaining an amount of Brillouin frequency shift from a frequency at which a magnitude of the difference is maximized.

* * * * *